(12) United States Patent
Farid et al.

(10) Patent No.: US 7,459,263 B2
(45) Date of Patent: *Dec. 2, 2008

(54) OPTICAL RECORDING MEDIA WITH TRIPLET-SENSITIZED ISOMERIZATION

(75) Inventors: Samir Y. Farid, Rochester, NY (US);
Douglas R. Robello, Webster, NY (US);
Joseph P. Dinnocenzo, Penfield, NY (US); Paul B. Merkel, Victor, NY (US);
Lorraine Ferrar, Fairport, NY (US);
Yeonsuk Roh, Rochester, NY (US);
Mark R. Mis, Hornell, NY (US)

(73) Assignee: Eastman Kodak Company, Rochester, NY (US)

( * ) Notice: Subject to any disclaimer, the term of this patent is extended or adjusted under 35 U.S.C. 154(b) by 774 days.

This patent is subject to a terminal disclaimer.

(21) Appl. No.: 10/944,580

(22) Filed: Sep. 17, 2004

(65) Prior Publication Data

US 2005/0136357 A1  Jun. 23, 2005

Related U.S. Application Data

(60) Provisional application No. 60/531,514, filed on Dec. 19, 2003.

(51) Int. Cl.
*G11B 7/24* (2006.01)

(52) U.S. Cl. .............. 430/270.11; 430/945; 428/64.8; 369/284; 369/283

(58) Field of Classification Search ............ None
See application file for complete search history.

(56) References Cited

U.S. PATENT DOCUMENTS

| | | | | |
|---|---|---|---|---|
| 3,876,519 A * | 4/1975 | McGinniss | .............. | 522/26 |
| 5,759,721 A | 6/1998 | Dhal et al. | | |
| 6,569,600 B2 | 5/2003 | Dinnocenzo et al. | | |
| 6,652,694 B1 * | 11/2003 | Nonaka et al. | .............. | 156/182 |
| 6,969,578 B2 * | 11/2005 | Robello et al. | .......... | 430/270.14 |
| 7,022,392 B2 * | 4/2006 | Dinnocenzo et al. | ....... | 428/64.1 |
| 2003/0072250 A1 * | 4/2003 | Dinnocenzo et al. | ..... | 369/275.1 |

FOREIGN PATENT DOCUMENTS

| | | | |
|---|---|---|---|
| JP | 02-038404 | * | 2/1990 |
| JP | 04-145102 | * | 5/1992 |
| JP | 2000-086588 | | 3/2000 |
| JP | 2001-222112 | * | 8/2001 |
| JP | 2004-224993 | * | 8/2004 |

OTHER PUBLICATIONS

Robello et al. "Quantum amplified isomerization: a new chemically amplified imaging system", Polym. Prepr. , vol. 42(2) pp. 717-718 (2001).*
Specht et al. "ketocoumarins, a new class of triplet sensitizers", Tetrahedron vol. 38(9) pp. 1203-1211 (1982).*
Turro, "Molecular Photochemistry", pp. 132 (1965).*
Allen et al. "New trends and developments in . . . ", Trends in Photochem & Photobiol. vol. 5 pp. 7-16(1999).*
Angiolini et al. "Copolymeric systems with pendant thioxanthone . . . ", J. Appl. Polymer. Sci., vol. 55(10) pp. 1477-1488 (1995).*
Yamaji et al., "deactivation mechanism of triplet exiplexes between benzophenone and sensitized triplet naphthalene dervatives", Chem. Lett., pp. 19-20 (1997).*
Roman et al., "Photoactivated valence isomerization . . . " J. Chem. Soc. Chem. Commun. pp. 1067-1068 (1984).*
Robello et al. "Quantum amplified isomerization: photoinitiatited electron transfer chain reactions in dewarbenzene substituted polymers", Polym. Prepr. , vol. 43(1) pp. 163-164 (2002).*
*J. Amer. Chem. Soc.* 95, 2738 (1973).
*Nouveau J. Chem.* 1, 363 (1977).

* cited by examiner

*Primary Examiner*—Martin J Angebranndt
(74) *Attorney, Agent, or Firm*—J. Lanny Tucker

(57) ABSTRACT

The invention relates to an optical recording material comprising: a polymeric matrix; a dewarbenzene derivative reactant capable of undergoing isomerization to a benzene product upon triplet excitation, thereby causing a change in optical properties; and a sensitizer capable of absorbing actinic radiation to cause triplet energy transfer to said reactant, wherein the algebraic sum of the excitation energy of said sensitizer and its reduction potential is at least 0.05 eV less than the oxidation potential of said reactant, thereby precluding one-electron oxidation of said reactant. The invention further relates to an optical device comprising regional variations in concentrations of reactants and products produced by triplet chain isomerization, thereby providing a pattern of intelligence.

61 Claims, No Drawings

OPTICAL RECORDING MEDIA WITH TRIPLET-SENSITIZED ISOMERIZATION

This is a 111A application of Provisional Application Ser. No. U.S. 60/531,514 filed Dec. 19, 2003.

FIELD OF THE INVENTION

This invention relates to an optical recording material that is capable of storing and retrieving information.

BACKGROUND OF THE INVENTION

The modern information revolution has led to an ever-increasing demand for data storage systems. As a case in point, CD and DVD disks represent successful high-volume data storage technologies. One major advantage of these technologies is that reading or writing of data is accomplished by shining light on the disk so there is no physical contact between the media and the optical head. However, the total storage capacity of these disks is limited by the size of the smallest marks on the surface of the media that can be read by the wavelength of light employed. Many attempts have been made to develop data storage systems with progressively smaller marks. However, the required equipment is prohibitively expensive, and the data access rates tend to be unacceptably slow.

One way to increase the storage capacity of a medium is to record the information depth-wise, rather than just on the surface. There could be used holography, two-photon optics, and similar methods for illuminating media in three dimensions, with the goal of producing marks in three dimensions, and thereby providing very high data capacity systems.

Bleaching and photoreactions (e.g., photochromicity) of organic dyes has also been used as a means to record optical data, both in a single layer in writeable CD-type media, and depth-wise (dissolved in a bulk piece of polymer). However, a large amount of optical power is required in these systems to produce readable marks, therefore the rate of recording of such media is slow. Also, many photochromic systems also tend to fade over time.

Holographic recording has also been achieved by optically induced birefringence in suitable polymers, a process which relies on photo-alignment of the side chains within the polymers. Once again, a large amount of optical power is required, and this process is inefficient and slow. In addition, the fidelity of the recorded information may degrade with time since optically induced orientation tends to relax over time in polymers.

JP 2000-086588 discloses a recording medium using changes in circular dichroism based on the interconversion of chiral norbornadiene and quadricyclane derivatives. However, this technique requires enantiomerically enriched compounds that are difficult to synthesize U.S. Pat. No. 5,759,721 discloses a holographic recording medium, which uses a photopolymerization technique, which can also be used for recording information optically in three dimensions.

There is a problem with this process, however, in that photopolymerization is usually accompanied by shrinkage of the material, which is a consequence of the process of forming new chemical bonds among the constituents. Dimensional changes that occur on writing limit the resolution that can be achieved, and reduce the data capacity of the medium. In addition, photopolymerization generally requires the use of low molecular weight reactants so that media made from these materials tend to be undesirably soft or sticky. Furthermore, the most common method of photopolymerization, free radical polymerization, is subject to interference by atmospheric oxygen, which causes undesirable inconsistencies in the process.

U.S. Pat. No. 6,569,600 B2 discloses an optical recording material based on a chemical transformation (e.g. isomerization) of a reactant in a polymeric binder, which is initiated by one-electron oxidation of the reactant via electron transfer to a sensitizer. While the electron transfer sensitized optical recording materials of U.S. Pat. No. 6,569,600 B2 offer potential advantages over prior art, the quantum yields (number of molecules transformed per photon absorbed) resulting from the electron transfer process in polymer binders are generally less than 2. Thus, relatively long exposure times and/or relatively high light intensities are required to record information.

Co-pending, commonly-assigned U.S. patent application Ser. No. 10/700,873 filed Nov. 4, 2003, discloses an optical recording article based on electron transfer sensitized isomerization in a polymeric matrix that is formed in-situ.

Photolytic chain isomerizations induced by triplet sensitizers are disclosed in $J.$ $Amer.$ $Chem.$ $Soc.$ 95, 2738 (1973) and in $Nouveau$ $J.$ $Chem.$ 1, 363 (1977). While isomerization quantum yields as high as 10 are calculated by extrapolation, measured quantum yields do not exceed 2. Furthermore, isomerizations are carried out in solution rather than in a polymeric matrix. The very high viscosities and restricted motions encountered in polymeric media can severely reduce efficiencies of many photochemical processes.

SUMMARY OF THE INVENTION

It is an object of this invention to increase the storage capacity of an optical recording material. It is another object of this invention to provide an optical recording material that can record information depth-wise, rather than just on the surface. It is a further object of this invention to provide an optical recording material that records information with a high quantum efficiency to minimize exposure time and/or light intensity. It is still another object of this invention to provide an optical recording material that does not substantially change dimensions upon recording. It is a further object of this invention to provide an optical device with a pattern of intelligence, such as a pattern of refractive indices that utilizes the triplet chain isomerization process of this invention.

These and other objects are achieved in accordance with the invention which comprises an optical recording material which when exposed to actinic radiation produces a change in optical properties in the exposed regions, thereby providing a pattern of intelligence for storing and retrieving information. The recording material comprises:

a polymeric matrix;

a dewarbenzene derivative reactant capable of undergoing isomerization to a benzene product upon triplet excitation, thereby causing a change in optical properties;

and a sensitizer capable of absorbing actinic radiation to cause triplet energy transfer to said reactant, wherein the algebraic sum of the triplet excitation energy of said sensitizer and its reduction potential is at least 0.05 eV less than the oxidation potential of said reactant, thereby precluding one-electron oxidation of said reactant.

A preferred embodiment further comprises a triplet cosensitizer that enhances isomerization by promoting chain propagation.

DETAILED DESCRIPTION OF THE INVENTION

In accordance with the invention, an optical recording material is obtained which possesses several advantages over the prior art.

1. The invention involves a photoinitiated chain reaction in a polymer matrix that creates changes in the optical properties of the material. However, because the invention relies on photoisomerization rather than photopolymerization, the dimensional changes accompanying recording are negligible. (No new bonds are formed between molecules.)

2. The invention involves a recording process that is efficient in the use of light. Because the process involves a photoinitiated chain reaction, many new molecules are formed per photon absorbed (chemical amplification). A relatively large change in optical properties can be obtained at low exposure to the recording beam. Furthermore, the isomerization reaction involves a triplet excited state chain process rather than an electron transfer chain process. In the latter process the reactant is positively charged and the chain process involves migration and/or separation of charged species. Charge migration and charge separation do not readily occur in high-viscosity, low-polarity polymers, which restricts isomerization quantum yields in an electron transfer chain process. The triplet chain photoisomerizations of this invention rely on energy transfer rather than charge migration. The degree of conversion of dewarbenzene derivatives to benzene products is also higher with the triplet chain isomerization process of this invention than with electron transfer isomerizations.

3. The material of the invention is a simple, stable polymer, which can be conveniently fabricated into films and slabs.

4. The optical changes in the material of the invention are large, permanent, localized, and can easily be detected, forming the basis for an optical storage medium. The invention is especially suited to three dimensional optical data recording systems such as holography and two-photon optics.

5. Unlike free radical polymerization, the triplet state isomerizations of this invention are not highly sensitive to molecular oxygen, and will not be subject to the inconsistent performance, which is commonly observed for free radical photopolymerizations that are currently used in the art.

These and other advantages will be apparent from the detailed description below.

The polymeric matrix or polymeric binder of this invention may comprise a linear, branched or cross-linked polymer or co-polymer. Any polymer may be used in the invention provided that it dissolves the reactant and sensitizer and does not substantially inhibit the triplet chain energy transfer process or the isomerization process. Preferred polymers for the practice of this invention have high transparency at the wavelengths of recording (sensitization) and reading. Also preferred are polymers that form clear, defect-free films or matrices. Suitable polymers for the practice of this invention include poly(alkyl methacrylates), such as poly(methyl methacrylate) (PMMA), poly(alkyl acrylates), polystyrene, polycarbonate, cellulose acetate, cellulose acetate butyrate, poly (vinylidine chloride-co-acrylonitrile), poly(vinyl acetate), and poly(vinyl butyral).

The polymer matrix may also contain a liquid organic plasticizer, such as dibutyl phthalte, dibutyl sebacate or di(2-ethylhexyl) adipate. Plasticizers can enhance isomerization and recording efficiencies by facilitating molecular motion. Typical plasticizer levels range from 1 to 20% by weight of the recording material, and preferably from 2 to 10% by weight of the optical recording material. The polymer matrix may also contain a preservative, such as a chlorinated phenol or an antioxidant such as 2-t-butyl-4-methoxyphenol (BHA).

The optical recording element of the invention may be in the form of a self-supporting slab or disk. It may also be coated on a support, such as poly(ethylene terephthalate), poly(ethylene naphthoate), polystyrene, cellulose acetate or inorganic supports such as glass, quartz and silicon. In a preferred embodiment, the support is a polyester, a polycarbonate or glass.

The surface of the substrate may be treated in order to improve the adhesion of the recording layer to the support. For example, the surface may be corona discharge treated prior to applying the optical recording material. Alternatively, an under-coating or subbing layer, such as a layer formed from a halogenated phenol or a partially hydrolyzed vinyl chloride-vinyl acetate copolymer, can be applied to the surface of the support.

The recording layer thickness may range from 1 µm to 1 cm, preferably from 20 µm to 2000 µm.

The polymeric matrix may be formed by in-situ polymerization, that is, polymerization in the presence of the reactant and sensitizer to produce the optical recording element as a solid solution.

Suitable in-situ polymeric matrices of this invention include those produced by polymerization of ethylenically unsaturated monomers such as styrene or its derivatives; acrylic or methacrylic esters such as ethyl acrylate, methyl methacrylate, butyl acrylate and cyclohexyl methacrylate; acrylic or methacrylic amides such as methyl methacrylamide, t-butyl acrylamide and isopropyl acrylamide; acrylonitrile; maleic anhydride; N-alkylmaleimides or N-arylmaleimides; vinyl ethers; vinyl esters, such as vinyl acetate; and vinyl halides. Matrix forming monomers may be used singly or in combination (i.e., copolymerized).

Any of the monomeric or crosslinkable polymeric film forming components disclosed in Jenkins et al and Heseltine et al. U.S. Pat. No. Re. 27,925 or Re. 27,922, respectively, are suitable for use in the matrixes of this invention. Tan et al U.S. Pat. No. 4,289,842 discloses matrixes comprising acrylate copolymers containing pendant groups, such as alkenyl groups with ethylenic unsaturation. Lindley U.S. Pat. No. 4,590,147 discloses vinyl oligomers which can be employed as matrices in this invention. Useful matrix forming components containing vinyl monomers are disclosed in Fuerniss U.S. Pat. No. 4,497,889 and Anderson et al. U.S. Pat. No. 4,535,052. Kosar "Light-Sensitive Systems," John Wiley & Sons, 1965, further describes a variety of useful film forming components for use in the practice of this invention, including ethylenically unsaturated monomers and polymers. Preferably, the monomer or monomers are liquids before polymerization to facilitate fabrication.

In preferred embodiments, monomers with more than one ethylenically unsaturated moiety can be employed, leading to cross-linked matrices. Cross-linked media are preferred because of improved stability. Monomers leading to cross-linked matrixes include divinylbenzene, ethylene glycol dimethacrylate, trimethylolpropane triacrylate, pentaerithritol tetraacrylate.

Further description of the preparation of in-situ polymeric matrices suitable for the practice of this invention is given in co-pending U.S. patent application Ser. No. 10/700,873 filed Nov. 4, 2003.

As noted above, the reactant used in this invention is a dewarbenzene derivative capable of undergoing isomerization to a benzene product upon excitation to the lowest triplet state, thereby causing a change in optical properties in the exposed regions of the optical recording material. With the proper choice of substituents, the dewarbenzene-to-benzene isomerization can yield a relatively large increase in refractive index to serve as the basis for optical recording.

The dewarbenzenes have another unusual property in that a large amount of potential energy is stored in their highly-strained ring structure. One consequence of this is that the isomerization of a dewarbenzene from its lowest triplet state has sufficient energy to yield a benzene product in a highly energetic (>70 kcal/mole) triplet state. This is referred to as adiabatic isomerization. Since the benzene triplet energy is higher than that of the dewarbenzene (<66 kcal/mole), the triplet benzene is able to transfer its energy to another molecule of the dewarbenzene, which can in turn isomerize to another molecule of triplet benzene. This chain process can lead to the isomerization of many molecules of dewarbenzene following the absorption of a single photon of light, resulting in high quantum yields of isomerization and high recording sensitivity. No new chemical bonds are formed between individual reactant molecules in this isomerization, therefore, there are negligible dimensional changes in the media during the recording event.

The reactant is usually present in a relatively high concentration both to yield large changes in optical properties and to promote more efficient triplet energy transfer. In a preferred embodiment, the reactant comprises from 2 to 80% by weight of the optical recording material.

The generic structure of the dewarbenzenes derivatives of this invention and their isomerization to benzene products is illustrated below:

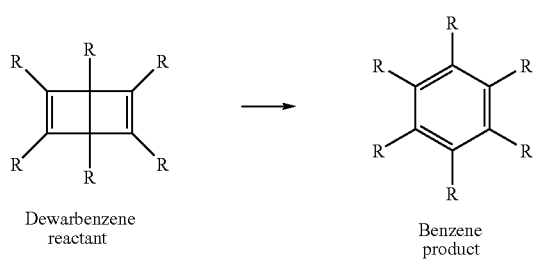

Dewarbenzene reactant    Benzene product

The R groups in the above formulas are individually selected from hydrogen; a substituted or unsubstituted alkyl or alkoxy group having from 1 to 12 carbon atoms, preferably 1-4 carbon atoms, such as methyl, ethyl, isopropyl and butyl; a substituted or unsubstituted alkoxycarbonyl group, such as methoxycarbonyl, ethoxycarbonyl or 1-naphthoxycarbonyl; a substituted or unsubstituted carbamoyl group such as dipropylcarbamoyl; a carboxylate group; a substituted or unsubstituted sulfonyl group, such as t-butylsulfonyl; a halogen, such as chloro; a cyano group; a substituted or unsubstituted aryl group having from 6 to 18 carbon atoms, such as phenyl, tolyl or naphthyl; and a substituted or unsubstituted heteroaromatic group such as furyl, thienyl, pyridyl, benzofuryl, or benzothienyl. Substituents on the aryl or heteroaryl groups include, for example, one or more alkyl, aryl, alkoxyl, aryloxyl and thioalkyl groups. In addition, two or more of the substituents R can be joined together to form a ring, such as a cycloalkene ring or an imide ring.

Especially preferred for the practice of this invention are dewarbenzene reactants of generic structures I, II, III and IV, below:

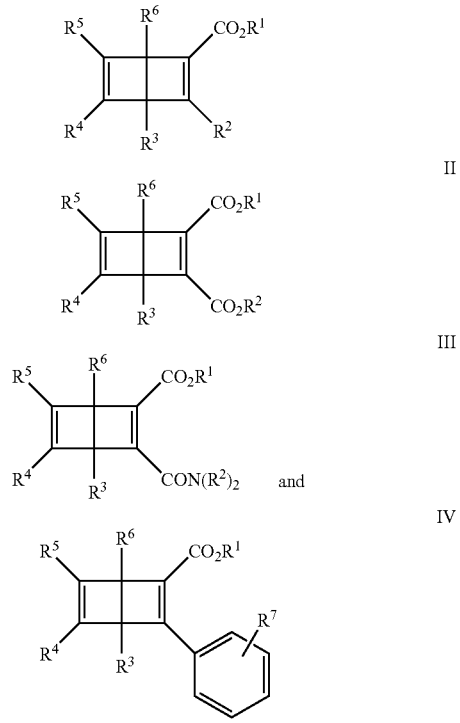

wherein $R^1$ and $R^2$ are individually selected from unsubstituted or substituted alkyl, phenyl or naphthyl groups, and $R^3$-$R^7$ are hydrogen atoms or alkyl groups. Most preferably, $R^3$-$R^7$ are methyl groups. $R^7$ may also be an alkoxy group or a group which forms a condensed ring such as naphthyl.

Specific examples of dewarbenzene reactants useful for the practice of this invention are shown in Table 1.

TABLE 1

| | Reactants |
|---|---|
| R-1 | H3C, CH3, CH3, H3C, CH3, CH3 |
| R-2 | H3C, CH3, CO2Et, H3C, CH3, CH3 |
| R-3 | H3C, CH3, CO2Et, H3C, CH3, phenyl |

TABLE 1-continued

| | Reactants |
|---|---|
| R-4 | cyclobutene with H3C, CH3, CH3, CH3 substituents and CO2-(1-naphthyl) group |
| R-5 | cyclobutene with H3C, CH3, CH3, CH3 substituents, CO2CH3 group and 2-ethylphenyl group |
| R-6 | cyclobutene with H3C, CH3, CH3, CH3 substituents and two CO2CH3 groups |
| R-7 | cyclobutene with H3C, CH3, CH3, CH3 substituents and two C(=O)NPr2 groups |
| R-8 | cyclobutene with H3C, CH3, CH3, CH3 substituents, CO2CH3 group and C(=O)NPr2 group |
| R-9 | bicyclic imide with H3C, CH3, CH3, CH3 substituents and N-Pr |
| R-10 | cyclobutene with H3C, CH3, CH3, CH3 substituents, CO2Et group and 2-methylphenyl group |
| R-11 | cyclobutene with H3C, CH3, CH3, CH3 substituents, CO2Et group and 2-methoxyphenyl group |

TABLE 1-continued

| | Reactants |
|---|---|
| R-12 | cyclobutene with H3C, CH3, CH3, CH3 substituents, CO2H group and CO2CH3 group |
| R-13 | cyclobutene with H3C, CH3, CH3, CH3 substituents and two CO2H groups |
| R-14 | cyclobutene with H3C, CH3, CH3, CH3 substituents and two C(=O)NHPr groups |
| R-15 | cyclobutene with H3C, CH3, CH3, CH3 substituents, C(=O)NHPr group and CO2CH3 group |
| R-16 | cyclobutene with H3C, CH3, CH3, CH3 substituents and two CO2Bu groups |
| R-17 | cyclobutene with H3C, CH3, CH3, CH3 substituents and CO2H group |
| R-18 | cyclobutene with H3C, CH3, CH3, CH3 substituents and C(=O)O-CH2CH2-O-C(=O)-C(CH3)=CH2 group |
| R-19 | cyclobutene with H3C, CH3, CH3, CH3 substituents, CO2CH3 group and C(=O)O-CH2CH2-O-C(=O)-C(CH3)=CH2 group |

TABLE 1-continued

Reactants

R-20 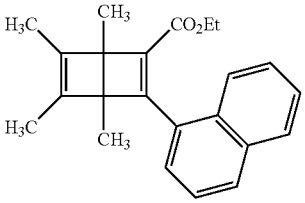

The reactant of this invention may also be covalently attached to the polymeric matrix of the invention. The reactant may also be covalently attached to a monomer or comonomer that is used to form the polymeric matrix of this invention via in-situ polymerization. Attachment of the reactant to the polymeric matrix can improve the stability of the recorded pattern of information by restricting the motion of product and reactant subsequent to recording. Attachment of the reactant to the polymeric matrix may also avoid solubility and volatility problems. Entries R-18 and R-19 in Table 1 are examples of reactants bearing polymerizable vinyl groups, and are therefore suitable reactants for covalent attachment to the polymeric matrix.

The sensitizer (S) used in the invention initiates the isomerization of the reactant (R) following absorption of actinic radiation. The sensitized chain isomerization process is illustrated in Scheme 1, below. The chain process that produces the isomerizaton of the reactant takes place in the lowest excited triplet state of the reactant ($^3R$). It involves the so-called adiabatic isomerization of $^3R$ to produce a benzene product that is also in its lowest triplet excited state ($^3P$). The highly energetic $^3P$ can subsequently transfer its energy to another molecule of reactant producing more $^3R$, which can in turn isomerize to additional $^3P$ to continue the chain process. Isomerization of $^3R$ to ground state P or so-called intersystem crossing of $^3R$ to ground state R may also occur, which in effect terminate the chain process.

The sensitizer must be capable of producing $^3R$ by transferring energy from its own lowest triplet excited state ($^3S$) after the sensitizer has absorbed light. To be effective in producing $^3R$, the sensitizer must have a lowest triplet energy that is not more than about 6 kcal/mole below the lowest triplet energy of the reactant. Preferably the triplet energy of the sensitizer is no more than about 4 kcal/mole below that of the reactant. More preferably, the triplet energy of the sensitizer is at least as high as that of the reactant. Furthermore, it is important that upon absorption of light the sensitizer yields $^3S$ efficiently. Since the absorption of light by the sensitizer generally produces an excited singlet state of the sensitizer ($^1S$), the $^1S$ state must first undergo so-called intersystem crossing to produce $^3S$, which initiates the isomerization through triplet energy transfer to the reactant (R).

Scheme 1

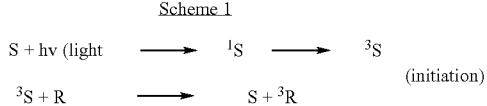

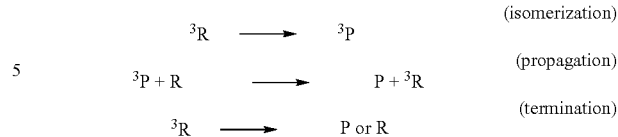

As disclosed in U.S. Pat. No. 6,569,600 B2, an optical recording material based on isomerization of a dewarbenzene may also be initiated by one-electron oxidation of the reactant via electron transfer to a sensitizer. As noted above, the transport and/or separation of charges required for such a process may be limited in a polymeric matrix, resulting in low quantum yields (i.e. low efficiencies). The transfer of triplet energy required for the current invention does not involve the migration of charges and can occur with high efficiency in polymeric matrices of high viscosity and low polarity.

To preclude the possibility of low-efficiency isomerization initiated by electron transfer, the sensitizer and reactant of this invention must be selected such that electron transfer from the reactant to the excited sensitizer does not readily occur. Specifically, the algebraic sum of the excitation energy of the initiating state (usually $^3S$ for the sensitizers of this invention) of the sensitizer and its reduction potential must be at least 0.05 eV less than the oxidation potential of the reactant.

The amount of sensitizer used in the optical recording material of this invention depends largely on its optical density at the wavelength(s) of light used to sensitize the isomerization. Solubility of the sensitizer may also a factor. If a monomeric material, the sensitizer will generally comprise from 0.002 to 20% by weight of the optical recording material of this invention. The sensitizer may also be covalently attached to the polymeric matrix of this invention. Either a polymer bound sensitizer or a monomeric sensitizer with a low extinction coefficient may be utilized at relatively high levels. Such high levels may help facilitate the transfer of triplet energy. When covalently attached to the polymeric matrix, the sensitizer may comprise from about 0.01 to 90% by weight of the optical recording material of this invention. An example of such a covalently bound sensitizer is a naphthalene moiety (that absorbs the actinic radiation).

The triplet energy that is required for the sensitizer of this invention depends upon the triplet energy of the dewarbenzene reactant that is being sensitized. The triplet energies of reactants R-1, R-2, R-6 and R-8 have been measured as 65.5, 61, 54 and 58 kcal/mole, respectively. Reactants with triplet energies as low as about 51 kcal/mole are contemplated for the invention. As noted above, the triplet energy of the sensitizer should be no more than about 6 kcal/mole lower than the reactant triplet energy. Thus, for a sensitizer of this invention the triplet energy should be at least 45 kcal/mole.

The triplet energies of the benzene products are in the vicinity of about 70-76 kcal/mole. Thus, there is sufficient energy in $^3P$ to produce $^3R$ via energy transfer. The reason that isomerization of $^3R$ can produce a higher-energy $^3P$ is due to the large amount of potential energy (about 60 kcal/mole) released upon isomerization of the highly strained reactant.

Since this invention relies on a triplet chain process, the sensitizer must have a reasonably high intersystem crossing quantum yield for the formation of $^3S$ on absorption of light. Preferably, the intersystem crossing quantum yield of a sensitizer of this invention is at least 0.2.

The triplet energies of the sensitizers of this invention may be obtained in a variety of ways. Energies for some sensitizers or closely related analogs are disclosed in the prior art. For most sensitizers, the lowest triplet state energies may be obtained from low-temperature (e.g., 77° K) phosphorescence spectra. The sensitizer is typically dissolved in a solvent (such as ethyl acetate) or a mixture of solvents and the solution is placed in an optical cell and immersed in liquid nitrogen. The sensitizer is then excited with light at a wavelength where it absorbs, and its phosphorescence spectrum is measured. The highest energy absorption band (the so-called 0-0 band) in the phosphorescence spectrum can usually be taken as the energy of the lowest triplet state of sensitizer. For sensitizers with weak or obscured emission or in which the ground state and lowest triplet state have substantial differences in geometry, triplet energies can be obtained either from rates of energy transfer from a series of molecules with known triplet energies or from measured equilibria with triplets of known energies. The former procedure is described in *J. Amer. Chem. Soc.* 102, 2152 (1980) and the latter procedure is described in *J. Phys. Chem.* 78, 196 (1974). In polymer matrices, sensitizers and other species can occupy sites of different polarity, such that exact triplet energies are site dependent. To the extent that this is true for the sensitizers, cosensitizers (see below for identification) and reactants in this invention, the reported triplet energies represent approximate or average values.

The ketocoumarins disclosed in *Tetrahedron* 38, 1203 (1982) represent one class of sensitizers useful for the practice of this invention. Other classes of sensitizers useful for the practice of this invention include xanthones, thioxanthones, arylketones and polycyclic aromatic hydrocarbons. Especially preferred are sensitizers that absorb visible light or near ultraviolet light.

Specific sensitizers useful for the practice of this invention include, but are not limited to, those shown below:

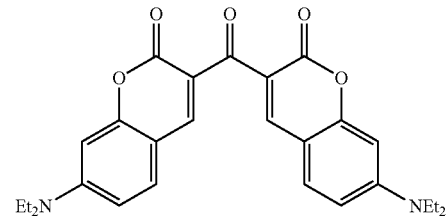

TABLE 2-continued

Sensitizers

S-13 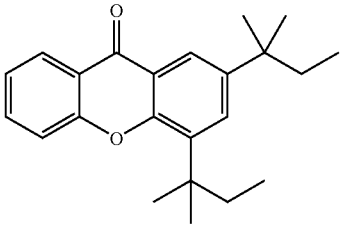

S-14 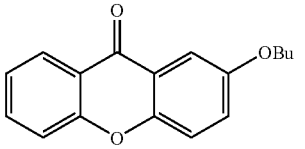

S-15 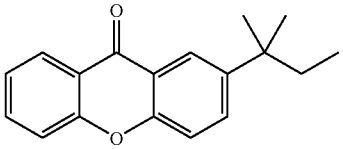

S-16 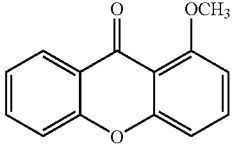

S-17 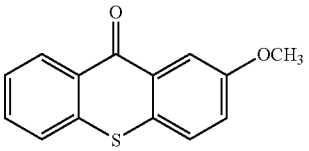

S-18 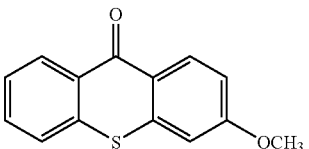

S-19 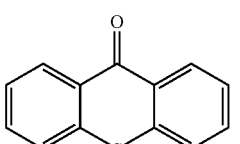

S-20 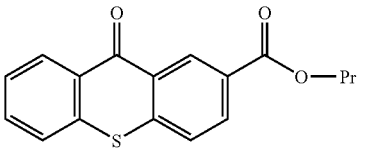

TABLE 2-continued

Sensitizers

S-21 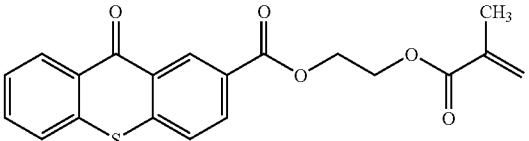

Entry S-21 in Table 2 is an example of a sensitizer bearing a polymerizable vinyl group, and are therefore a suitable sensitizer for covalent attachment to the polymeric matrix.

Triplet energies of sensitizers S-1, S-2, S-3, S-4, S-5, S-6, S-7, S-8 and S-10 have been measured (via phosphorescence) in ethyl acetate as 62, 56, 63, 57.5, 50.5, 57, 60.5 56.5 and 56 kcal/mole, respectively. The triplet energies of the reactants noted above were measured by the procedure described in *J. Amer. Chem. Soc.* 102, 2152 (1980), which was also noted above. A plot of the logarithm of the rate constant for the quenching of $^3S$ by R vs the triplet energy of S for a series of sensitizers yields a value for the triplet energy of R.

The optical recording material of this invention may further comprise a so-called cosensitizer to assist in the transfer of triplet energy to reactant. The transfer of triplet energy occurs efficiently only over a short distance (about 1.0-1.5 nm). Once substantial isomreization has occurred in the vicinity of a sensitizer molecule, a shell of benzene product is produced that inhibits further transfer of energy from sensitizer to reactant due to the high triplet energy of the benzene product and the distance between $^3S$ and R. If a cosensitizer with a triplet energy not too far above that of the sensitizer is added to the optical recording material, the cosensitizer may serve as a bridge in the transfer of triplet energy from $^3S$ to R, Scheme 2, even after a shell of product has formed around the sensitizer. Like the sensitizer, the cosensitizer should not have a triplet energy more than about 6 kcal/mole below the triplet energy of the reactant, and preferably not more than 4 kcal/mole below the triplet energy of the reactant.

The cosensitizer can also assist in the transfer of triplet energy from $^3P$ to R, Scheme 2, as long as the cosensitizer has triplet energy not significantly greater than the triplet energy of P. While dependent on structure, the $^3P$ energies are in the range of about 70-76 kcal/mole for the P of this invention, as previously noted. Thus, a cosensitizer of this invention must generally have a triplet energy in the range of about 45-72 kcal/mole. The most effective cosensitizers will have a triplet energy between about 4 kcal/mole above the triplet energy of the sensitizer and about 4 kcal/mole below the triplet energy of the reactant. The cosensitizer should not absorb more than about 10 percent of the actinic radiation absorbed by the sensitizer, if it is to function as described. Otherwise, it is more properly considered as a sensitizer itself. If either a sensitizer or a cosensitizer produces excessive light absorption at the sensitization wavelength, it can restrict isomerization to a relatively thin layer near the exposed surface and reduce overall isomerization yields due to inefficient light penetration through the rest of the sample.

Scheme 2

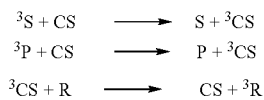

The cosensitizer may be monomeric or it may be covalently attached to a polymeric matrix. Incorporating the cosensitizer as part of the polymer can allow high concentrations of cosensitizer and increase isomerization quantum efficiencies. A monomeric cosensitizer may comprise from about 2 to 20 percent by weight of the optical recording material. If covalently attached to the polymeric matrix, the cosensitizer may comprise from about 2 to 90 percent of the optical recording material.

Cosensitizers useful for the practice of this invention include derivatives of naphthalene, biphenyl, binaphthyl, terphenyl, fluorene, phenanthrene and pyrene. Naphthalene derivatives with electron-withdrawing substituents, such as alkoxycarbonyl groups, cyano groups and chlorine atoms, are particularly useful as cosensitizers.

Polymeric cosensitisers may serve as part of the polymeric matrix or constitute the entire polymeric matrix of the invention and include poly(vinylnaphthoate), poly(naphthylacrylate) and poly(vinylnaphthalene).

Examples of cosensitizers useful for the practice of this invention include, but are not limited to, those below:

TABLE 3

Cosensitizers

| | |
|---|---|
| CS-1 | ![naphthalene-CO2Et] |
| CS-2 | ![naphthalene-1,5-bis(CO2Et)] |
| CS-3 | ![2-naphthalene-CO2CH3] |
| CS-4 | ![2-naphthalene-CH2CO2CH3] |
| CS-5 | ![dimethylbiphenyl diacetate] |
| CS-6 | ![BuO2C-biphenyl-CO2Bu] |
| CS-7 | ![9-fluorenyl-CO2CH3] |

TABLE 3-continued

| Cosensitizers | |
|---|---|
| CS-8 | pyrene-(CH2)3-CO2CH3 |
| CS-9 | 2,6-naphthalene with CO2Et and EtO2C |
| CS-10 | 1,4-naphthalene with CO2CH3 and CO2CH3 |
| CS-11 | methylphenanthrene (CH3) |
| CS-12 | 1-naphthonitrile (CN) |
| CS-13 | BuO2C—C6H4—C6H4—C6H4—CO2Bu |
| CS-14 | phenanthrene-CN |
| CS-15 | terphenyl with CO2Bu and BuO2C (meta) |
| CS-16 | BuO2C—C6H4—C6H4—CF3 |
| CS-17 | BuO2C—C6H4—C6H4—CF3 (meta) |

TABLE 3-continued

Cosensitizers

CS-18 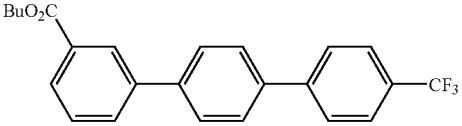

CS-19 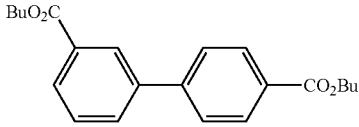

CS-20 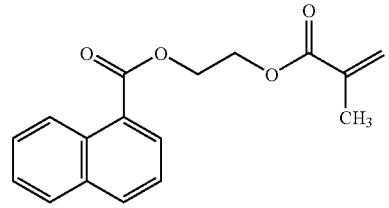

CS-21 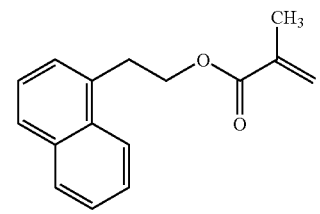

Entries CS-20 and CS-21 in Table 3 are examples of cosensitizers bearing polymerizable vinyl groups, and are therefore suitable cosensitizers for covalent attachment to the polymeric matrix.

The optical recording material or optical device of this invention may further comprise a protective overcoat layer. The overcoat layer may provide abrasion resistance and may comprise an absorber material that absorbs light in the same wavelength region as the sensitizer.

EXAMPLES

The following examples illustrate the practice of the invention. They are not intended to be exhaustive of all possible variations of the invention. Parts and percentages are by weight unless otherwise indicated. Synthesized compounds were characterized by $^1$H nuclear magnetic resonance spectroscopy ($^1$H NMR) in the solvents indicated. Chemical shifts are listed in parts per million (δ) from internal tetramethylsilane.

Synthesis of dimethyl tetramethyldewarbenzene dicarboxylate (R-6)

A stirred mixture of aluminum chloride (61.8 g, 0.463 mol) and dichloromethane (500 mL) at 0° C. under nitrogen was treated dropwise with 2-butyne (50 g, 0.924 mol) dissolved in dichloromethane (150 mL). The mixture was stirred at 0° C. for 30 min, and then treated dropwise with dimethyl acetylenedicarboxylate (48.8 g, 0.343 mol) dissolved in dichloromethane (150 mL). The resulting mixture was stirred at 0° C. for 30 min, and then treated dropwise with a solution of dimethylsulfoxide (150 mL) and dichloromethane (150 mL). The resulting mixture was stirred at 0° C. for 45 min, then poured into 1 L of water. The organic layer was separated, and the aqueous phase was extracted twice with ligroin. The combined organic extracts were washed three times with water and once with brine, dried over sodium sulfate and concentrated at reduced pressure. The crude product was vacuum distilled at reduced pressure, collecting the fraction boiling at 70-75° C./0.08 mm. The resulting pale yellow oil was dissolved in hexane; and the solution was cooled to −78° C. to precipitate the product as a white solid. After filtration and drying in vacuo, the yield was 65 g (65% of theory). $^1$H NMR (CDCl$_3$): δ 1.29 (s, 6H), 1.63 (s, 6H), 3.88 (s, 6H).

Synthesis of methyl tetramethyldewarbenzene dicarboxylate (R-12)

Dimethyl tetramethyldewarbenzene dicarboxylate (R-6, 5.0 g, 20 mmol) was dissolved in 80 mL of tetrahydrofuran and cooled to 0° C. and treated with 80 mL of 0.375 M aqueous NaOH (30 mmol). The resulting mixture was stirred at 0° C. for 2 h, and then warmed to ambient. The mixture was washed three times with diethyl ether, and the aqueous phase was separated and acidified. The resulting precipitate was extracted into ethyl acetate and dried over sodium sulfate. The solvent was removed at reduced pressure to deposit a yellow solid. The product was purified by column chromatography. The yield was 3.2 g (68% of theory). $^1$H NMR (CDCl$_3$): δ 1.30 (s, 3H), 1.35 (s, 3H), 1.60 (s, 3H), 1.64 (s, 3H), 3.90 (s, 3H), 12.10 (s, 1H).

Synthesis of tetramethydewarbenene dicarboxylic acid (R-13)

This compound was obtained as a by-product during the synthesis of methyl tetramethyldewarbenzenedicarboxylate (R-12), and was isolated by column chromatography. $^1$H NMR (CDCl$_3$): δ 1.30 (s, 6H), 1.60 (s, 6H), 12.0 (s, 2H).

Synthesis of ethyl 2-phenyltetramethyldewarbenzoate (R-3)

This compound was prepared by the procedure for dimethyl tetramethyldewarbenzenedicarboxylate (R-6), except that ethyl phenylpropiolate was used in place of dimethyl acetylene dicarboxylate. The product was obtained as a white solid in 50% yield. $^1$H NMR (CDCl$_3$): δ 1.30 (s, 3H), 1.32 (t, 3H), 1.35 (s, 3H), 1.65 (s, 3H), 1.75 (s, 3H), 4.25 (m, 2H), 7.36 (m, 3H), 7.98 (d, 2H).

Synthesis of N,N,N',N'-tetrapropyl tetramethyldewarbenzenedicarboxylamide (R-7)

Tetramethydewarbenenedicarboxylic acid (R-13, 1.5 g, 6.7 mmol) and two drops of N,N-dimethylformamide were dissolved in 15 mL of anhydrous dichloromethane. The stirred solution was cooled to 0° C. and treated dropwise with 1.97 g (15.5 mmol) of oxalyl chloride under nitrogen. After 10 min, the mixture was warmed to ambient and stirred for 4 h. The mixture was concentrated at reduced pressure to deposit the diacid chloride intermediate as a yellow oil. This oil was dissolved in 15 mL of anhydrous dichloromethane, cooled to 0° C. with stirring under nitrogen, and treated dropwise with 2.39 g (23.6 mmol) of diproplyamine. The mixture was warmed to room temperature, and stirred for 10 h. Methanol (5 mL) was added, and the resulting solution was washed twice with water and once with brine, and then dried over sodium sulfate. The solvent was removed at reduced pressure to deposit a gold oil. This product was purified by column chromatography, followed by precipitation into excess hexane at −78° C. The yield was 1.4 g (55% of theory). $^1$H NMR (CDCl$_3$): δ 0.75 (t, 6H), 0.85 (t, 6H), 1.22 (s, 6H), 1.40 (q, 4H), 1.5 (q, 4H), 1.65 (s, 6H), 3.2 (m, 8H).

Synthesis of methyl 2-[(dipropylamino carbonyl]tetramethyldewarbenzoate (R-8)

This compound was prepared by the procedure for N,N,N',N'-tetrapropyl tetramethyldewarbenzene dicarboxylamide (R-7), except that methyl tetramethyldewarbenzene dicarboxylate (R-12) was used instead of tetramethydewarbenene dicarboxylic acid (R-13). The product was obtained as a white solid in 57% yield. $^1$H NMR (CDCl$_3$): δ 0.80 (t, 3H), 0.90 (t, 3H), 1.20 (s, 3H), 1.30 (s, 3H), 1.50 (m, 4H), 1.58 (s, 3H), 1.66 (s, 3H), 3.1 (m, 2H), 3.38 (m, 1H), 3.65 (m, 1H), 3.65 (s, 3H).

Synthesis of N,N'-dipropyl tetramethyldewarbenzene dicarboxylamide (R-14)

This compound was prepared by the procedure for N,N,N',N'-tetrapropyl tetramethyldewarbenzene dicarboxylamide (R-7), except that propylamine was used instead of dipropylamine. The product was obtained as a white solid in 50% yield. $^1$H NMR (CDCl$_3$): δ 0.90 (t, 6H), 1.33 (s, 6H), 1.60 (q, 4H), 1.68 (s, 6H), 3.6 (m, 4H).

Synthesis of methyl 2-[(propylamino)carbonyl]tetramethyldewarbenzoate (R-8)

This compound was prepared by the procedure for N,N,N',N'-tetrapropyl tetramethyldewarbenzene dicarboxylamide (R-7), except that propylamine was used instead of dipropylamine, and methyl tetramethyldewarbenzene dicarboxylate (R-12) was used instead of tetramethydewarbenene dicarboxylic acid (R-13). The product was obtained as a white solid in 48% yield. $^1$H NMR (CDCl$_3$): δ 0.90 (t, 3H), 1.20 (s, 3H), 1.30 (s, 3H), 1.55 (s, 3H), 1.60 (m, 2H), 1.65 (s, 3H), 3.2 (q, 2H), 3.80 (s, 3H), 8.6 (s, 1H).

Synthesis of dibutyl detramethyldewarbenzoate (R-16)

First, dibutyl acetylenedicarboxylate was prepared. A mixture of 2-butynedioic acid (5.0 g, 44 mmol), n-butyl alcohol (162 g, 2.19 mol), and sulfuric acid (0.86 g, 9 mmol) was heated at reflux for 6 hours. The mixture was cooled to ambient, washed with 10% aqueous NaHCO$_3$ then with brine, dried (Na$_2$SO$_4$), concentrated, and the resulting crude product distilled under reduced pressure (bp 65-70° C./0.08 mm). Dibutyl acetylenedicarboxylate was obtained as a colorless oil (8.5 g, 86% of theory). $^1$H NMR (CDCl$_3$): δ 1.90 (t, 6H), 1.38 (m, 4H), 1.65 (m, 4H), 4.20 (t, 4H).

The procedure for the preparation of dibutyl tetramethyldewarbenzoate (R-16) was similar to that of dimethyl tetramethyldewarbenzene dicarboxylate (R-6) except that dibutyl acetylenedicarboxylate was used in place of dimethyl acetylenedicarboxylate. The product was obtained as a yellow oil in 68% yield. $^1$H NMR (CDCl$_3$): δ 1.90 (t, 6H), 1.25 (s, 6H), 1.38 (m, 4H), 1.60 (s, 6H), 1.65 (m, 4H), 4.15 (t, 4H).

Synthesis of pentamethyl dewarbenzoic acid (R-17)

First, 9-fluorenylmethyl 2-butynoate was prepared. A mixture of 2-butynoic acid (11.6 g, 138 mmol), 9-fluorenemethanol (35.2 g, 179 mmol), dimethylamino-pyridine-p-toluenesulfonic acid salt (16.3 g, 55 mmol), and anhydrous dichloromethane (210 mL) was cooled to 0° C. under nitrogen, and 1,3-dicyclohexylcarbodiimide (34.2 g, 166 mmol) was added. After 15 min, the reaction mixture was warmed to ambient and stirred for 12 h. The urea by product was filtered, and the filtrate was washed successively with 10% aqueous HCl, 10% aqueous NaHCO$_3$, water, and brine. The solution was dried (Na$_2$SO$_4$) and concentrated to deposit a yellow oil. The product was purified by column chromatography to provide 20.0 g (54% of theory) of 9-fluorenylmethyl 2-butynoate as a yellow-green solid. $^1$H NMR (CDCl$_3$): δ 1.98 (s, 3H), 4.20 (m, 1H), 4.45 (d, 2H), 7.32 (m, 4H), 7.60 (d, 2H), 7.70 (d, 2H).

Next, 9-fluorenylmethyl pentamethyldewarbenzoate was prepared. A mixture of aluminum chloride (12.3 g, 92 mmol) and anhydrous dichloromethane (50 mL) was cooled to 0° C. with stirring under nitrogen, treated dropwise with 2-butyne (10.0 g, 185 mmol) dissolved in dichloromethane (25 mL), and stirred at 0° C. for 30 min. The mixture was then treated dropwise with a solution of 9-fluorenylmethyl 2-butynoate (17.9 g, 68 mmol) in dichloromethane (25 mL). The mixture was stirred at 0° C. for 30 min, and then a solution of dimethylsulfoxide (25 mL) and dichloromethane (25 mL) was added. The mixture was stirred at 0° C. for 45 min, warmed to ambient, and poured into 1 L of water. The mixture was extracted twice with ligroin, and then the combined organic extracts were washed three times with water and once with brine. The solution was dried ($Na_2SO_4$) and concentrated. The resulting crude product was recrystallized from methanol to provide 14 g (56% of theory) of 9-fluorenylmethyl pentamethyldewarbenzoate as a tan solid. $^1$H ($CDCl_3$): δ 1.10 (s, 3H), 1.15 (s, 3H), 1.45 (s, 3H), 1.55 (s, 3H), 1.95 (s, 3H), 4.25 (m, 1H), 4.45 (d, 2H), 7.32 (m, 4H), 7.60 (d, 2H), 7.70 (d, 2H).

Finally, pentamethyl dewarbenzoic acid (R-17) was prepared. A solution of 9-fluorenylmethyl pentamethyldewarbenzoate (13.0 g, 35 mmol) in dichloromethane (50 mL) was treated dropwise with piperidine (12.0 g, 140 mmol) and then stirred at room temperature for 20 h. The reaction mixture was partitioned between ligroin and 10% aqueous HCl. The organic layer was extracted three times with aqueous 5% potassium hydroxide, and the combined aqueous extracts were then acidified with HCl. The precipitated product was extracted into ethyl acetate, and the organic layer was dried ($Na_2SO_4$) and the solvent was removed to provide 5.5 g (82% of theory) of a white solid. $^1$H ($CDCl_3$): δ 1.15 (s, 3H), 1.25 (s, 3H), 1.45 (s, 3H), 1.58 (s, 3H), 1.64 (s, 3H), 2.05 (s, 3H).

Synthesis of (2-methacryloyloxyethyl)pentamethyldewarbenzoate (R-18)

A mixture of pentamethyldewarbenzoic acid (R-17, 3.8 g, 19.8 mmol), 2-hydroxyethylmethacrylate (7.7 g, 59.3 mmol), 2.3 g, 7.9 mmol) of dimethylaminopyridine p-toluenesulfonic acid salt, and anhydrous dichloromethane (31 mL) was cooled to 0° C. under nitrogen, and 1,3-dicyclohexylcarbodiimide (5.3 g, 25.7 mmol) was added. After 15 min, the reaction mixture was warmed to ambient and stirred for 12 h. The precipitated urea by product was filtered, and the filtrate was washed successively with 10% aqueous HCl, 10% aqueous $NaHCO_3$, water, and brine. The organic layer was dried ($Na_2SO_4$) and concentrated to deposit yellow oil. The product was purified by vacuum distillation, collecting the fraction bp 85-90° C./0.05 mm. The yield was 3.0 g (50% of theory) of a clear oil. $^1$H NMR ($CDCl_3$): δ 1.15 (s, 3H), 1.23 (s, 3H), 1.60 (d, 6H), 1.95 (s, 3H), 2.00 (s, 3H), 4.35 (m, 4H), 5.6 (s, 1H), 6.25 (s, 1H).

Synthesis of methyl (2-methacryloyloxyethyl)tetramethyldewarbenzene-dicarboxylate (R-19)

The procedure for (2-methacryloyloxyethyl) pentamethyldewarbenzoate (R-18) was followed, except that pentamethyldewarbenzoic acid (R-17) was replaced by methyl tetramethyldewarbenzene dicarboxylate (R-12). The crude product was purified by column chromatography to provide 4.5 g (60% of theory) of a clear oil. $^1$H NMR ($CDCl_3$): δ 1.20 (s, 3H), 1.23 (s, 3H), 1.55 (s, 3H), 1.58 (s, 3H), 1.90 (s, 3H), 3.72 (s, 3H), 4.35 (m, 4H), 5.5 (s, 1H), 6.1 (s, 1H).

Synthesis of ethyl 2-naphthyltetramethyldewarbenzoate (R-20)

First, ethyl 1-naphthylpropiolate was prepared. A mixture of 1-ethynylnaphthalene (7.7 g, 50.6 mmol), 4-(dimethylamino)pyridine (0.06 g, 0.5 mmol), 1,2,2,6,6-pentamethylpiperidine (8.8 g, 55.7 mmol), and acetonitrile (120 mL) was sparged with nitrogen for 10 min, and then tetrakis(triphenylphosphine)palladium(0) (1.3 g, 1.1 mmol) was added. The mixture was sparged with nitrogen for 10 min, heated to reflux, treated dropwise with ethyl chloroformate (12.1 g, 111.3 mmol), and held at reflux for 2 h. The reaction mixture was cooled to ambient and diluted with ligroin. The solution was washed three times with water and then with brine, dried ($Na_2SO_4$), and concentrated to deposit a brown oil. The crude product was purified by column chromatography to provide 4.0 g (36% of theory) of ethyl 1-naphthylpropiolate. $^1$H NMR ($CDCl_3$): δ 1.40 (t, 3H), 4.33 (q, 2H), 7.50 (m, 3H), 7.90 (m, 3H), 8.30 (d, 1H).

Finally, ethyl 2-naphthyltetramethyldewarbenzoate (R-20) was prepared by the procedure for dimethyl tetramethyldewarbenzene dicarboxylate (R-6), except that ethyl 1-naphthylpropiolate was used in place of dimethyl acetylenedicarboxylate. The crude product was purified by column chromatography to provide 2.0 g (33% theory) of a pale yellow oil. $^1$H ($CDCl_3$): δ 1.00 (t, 3H), 1.25 (s, 3H), 1.45 (s, 3H), 1.77 (s, 6H), 4.00 (q, 2H), 7.42 (m, 4H), 7.90 (m, 3H).

Synthesis of 2,4-di-(tert-amyl)xanthen-9-one (S-13)

First, methyl 2,4-di-(tert-amyl)phenoxybenzoate was prepared. To a stirred suspension under argon of sodium hydride (60% dispersion in mineral oil, 1.1 g, 46.5 mmol, washed with ligroin to remove the oil) in pyridine (60 mL) was added dropwise a solution of 2,4-di-(tert-amyl)phenol (12.0 g, 51.2 mmol) in 20 mL of pyridine. The mixture was stirred for 2 h at room temperature and then treated dropwise with a solution of methyl 2-bromobenzoate (10 g, 46.5 mmol) in 10 mL of pyridine. Copper (I) chloride (1.15 g, 11.6 mmol) was added, and the mixture was heated at reflux 16 h and then cooled to ambient. The mixture was diluted with diethyl ether, washed successively with 10% aqueous HCl, water, and brine, and then dried over $Na_2SO_4$. The solvent was removed at reduced pressure to deposit dark brown oil. This crude product was purified by column chromatography to give 25.5 g, 78% of theory) of a light brown oil. $^1$H NMR ($CDCl_3$): δ 0.70 (t, 6H), 1.3 (s, 6H), 1.4 (s, 6H), 1.63 (q, 2H), 1.85 (q, 2H), 3.85 (s, 3H), 6.68 (d, 1H), 6.82 (d, 1H), 7.05 (m, 2H), 7.3 (br s, 1H), 7.35 (t, 1H), 7.9 (dd, 1H).

Next 2,4-di-(tert-amyl)phenoxybenzoic acid was prepared. A mixture of methyl 2,4-di-(tert-amyl)phenoxybenzoate (7.44 g, 20 mmol), potassium hydroxide (2.3 g, 40 mmol), and ethanol (60 mL) was heated at reflux for 4 h and then cooled to ambient. Diethyl ether (20 mL) was added, and the mixture was washed twice with 10% aqueous HCl. The organic layer was dried ($Na_2SO_4$) and the solvent was removed at reduced pressure to deposit a yellow solid. This crude product was purified by recrystallization from heptane to provide 5.0 g, 70% of theory) of 2,4-di-(tert-amyl)phenoxybenzoic acid as a tan solid. $^1$H NMR ($CDCl_3$): δ 0.75 (t, 6H), 1.3 (s, 6H), 1.4 (s, 6H), 1.65 (q, 2H), 1.80 (q, 2H), 3.85 (s, 3H), 6.80 (d, 2H), 7.15 (m, 2H), 7.35(br s, 1H), 7.45 (t, 1H), 8.2 (d, 1H).

Finally, 2,4-di-(tert-amyl)xanthen-9-one (S-13) was prepared. To a suspension of 2,4-di-(tert-amyl)phenoxybenzoic acid (4.8 g, 13.6 mmol) in acetic anhydride (27.7 g, 272 mmol) was added dropwise sulfuric acid (1.33 g, 13.6 mmol), and then the mixture was held at 80° C. for 3 h. The reaction mixture was cooled to ambient and poured into 100 mL of ice water. The aqueous phase was extracted twice with dichloromethane, and the combined organic extracts were washed with water and then with brine. The solution was dried ($Na_2SO_4$) and concentrated deposit a brown solid. The product was purified by column chromatography to provide 3.5 g (76% of theory) of a white solid. $^1$H NMR ($CDCl_3$): δ 0.75 (t, 6H), 1.3 (s, 6H), 1.4 (s, 6H), 1.65 (q, 2H), 1.80 (q, 2H), 3.85 (s, 3H), 6.80 (d, 2H), 7.15 (m, 2H), 7.35 (br s, 1H), 7.45 (t, 1H), 8.2 (d, 1H).

Synthesis of 2-butoxyxanthen-9-one (S-14)

First, 2-(4-butoxyphenoxy)benzoic acid was prepared. A stirred mixture of 2-chlorobenzoic acid (10.0 g, 64 mmol), 4-butoxyphenol (12.7 g, 77 mmol), potassium carbonate (17.6 g, 128 mmol), copper powder (0.24 g, 3.8 mmol), copper (I) iodide (0.20 g, 1.3 mmol), dithioerithritol (0.20 g, 1.3 mmol), and 75 mL of N,N-dimethylformamide was heated at reflux for 5 h and then cooled to ambient. The reaction mixture was poured onto a mixture of 300 g of ice plus 100 mL of 10% aqueous HCl. The precipitated product was extracted into diethyl ether. The product was purified by extraction into 5% aqueous NaOH, followed by acidification with concentrated HCl. The precipitate was collected, washed with water, and dried in vacuo over $CaSO_4$ to provide 8.27 g (45% of theory) of 2-(4-butoxyphenoxy)benzoic acid as a brown powder.

Finally, 2-butoxyxanthen-9-one (S-14) was synthesized. A stirred suspension under argon of 2-(4-butoxyphenoxy)benzoic acid (8.2 g, 29 mmol) in acetic anhydride (50 mL) was treated with 2.8 g (29 mmol) of concentrated sulfuric acid, and then held at 80° C. for 3 h. The mixture was cooled to ambient, and then poured onto 500 g of ice. The precipitated crude product was collected, washed with water, and air dried. The product was purified by column chromatography followed by recrystallization from 50% aqueous ethanol. A white powder was obtained. $^1H$ NMR ($CDCl_3$): δ 1.00 (t, 3H), 1.5 (m, 2H), 1.85 (m, 2H), 4.08 (t, 2H), 7.3-7.5 (m, 4H), 7.7 (m, 2H), 8.36 (d, 1H).

Synthesis of 2-tert-amylxanthen-9-one (S-15)

This compound was prepared by the procedure for 2-butoxyxanthone (S-14), except that 4-tert-amylphenol was used instead of 4-butoxyphenol. The intermediate 2-(4-tert-amylphenoxy)benzoic acid was obtained in 65% yield. The final product was purified by column chromatography followed by successive recrystallizations from ligroin and then from 60% aqueous ethanol, and obtained in 66% yield. $^1H$ NMR ($CDCl_3$): δ 0.68 (t, 3H), 1.37 (s, 9H), 1.71 (q, 2H), 7.37 (t, 1H), 7.45 (m, 2H), 7.7 (m, 2H), 8.27 (s, 1H), 8.36 (d, 1H).

Synthesis of 1-methoxythioxanthen-9-one (S-16)

A stirred mixture of 1-hydroxyxanthene-9-one, iodomethane (11.17 g, 79 mmol), cesium carbonate (10.26 g, 31 mmol), and acetonitrile (50 mL) under nitrogen was heated at 50° C. for 24 h and then cooled to ambient. The mixture was filtered and the filtrate was concentrated to deposit a yellow solid. The product was purified by recrystallization from heptane/toluene to provide 2.40 g (67% of theory) of a light yellow solid. $^1H$ NMR ($CDCl_3$): δ 4.02 (s, 3H), 6.80 (d, 1H), 7.05 (d, 1H), 7.35 (m, 2H), 7.6 (m, 2H), 8.30 (dd, 1H).

Synthesis of 1-methoxythioxanthen-9-one (S-12)

First, 2-[(3-methoxyphenyl)thio]benzoic acid was prepared. A mixture of thiosalicylic acid (1.5 g, 9.7 mmol), 3-methoxyiodobenzene (4.6 g, 19.4 mmol), copper (I) iodide (0.07 g, 0.4 mmol), potassium carbonate (4.0 g, 29.2 mmol), and N,N-dimethylformamide (25 mL) was heated at reflux for 2 h and then cooled to ambient. The reaction mixture was diluted with ether, washed twice with 10% aqueous HCl, and dried ($Na_2SO_4$). The solvent is removed at reduced pressure to deposit a brown solid. The product was purified by recrystallization from heptane to provide 1.0 g (40% of theory) of 2-[(3-methoxyphenyl)thio]benzoic acid as a tan solid. $^1H$ NMR ($CDCl_3$): δ 3.80 (s, 3H), 6.90 (d, 1H), 7.00 (d, 1H), 7.25 (m, 5H), 8.11 (d, 1H).

Next, 2-[(3-methoxyphenyl)thio]diethylbenzamide was prepared. A stirred solution under nitrogen of 2-[(3-methoxyphenyl)thio]benzoic acid (0.75 g, 3 mmol) and two drops of N,N-dimethylformamide in anhydrous dichloromethane (10 mL) was cooled to 0° C. and treated dropwise with oxalyl chloride (0.73 g, 6 mmol). After 10 min, the reaction mixture was warmed to ambient and stirred for 4 h. The solvent and excess oxalyl chloride was removed at reduced pressure to deposit a yellow solid. This solid was dissolved in anhydrous dichloromethane (10 mL), cooled to 0° C. with stirring under nitrogen, and treated dropwise with diethylamine (0.42 g, 6 mmol). The reaction mixture was warmed to ambient and stirred for 10 h. Methanol (5 mL) was added, and the resulting solution was washed twice with water, and then with brine. The solution was dried ($Na_2SO_4$) and the solvent was removed at reduced pressure to deposit a gold oil. The product was purified by column chromatography to provide 0.45 g, 55% of theory) of 2-[(3-methoxyphenyl)thio]diethylbenzamide as a colorless oil. $^1H$ NMR ($CDCl_3$): δ 1.05 (t, 3H), 1.25 (t, 3H), 3.15 (q, 2H), 3.60 (br q, 2H), 3.80 (s, 3H), 6.80 (d, 1H), 7.00 (t, 2H), 7.25 (m, 5H).

Finally, 1-methoxythioxanthen-9-one (S-12) was prepared. A stirred mixture of 2.05 mL of a 2.0 M solution in heptane/THF of lithium diisopropylamide (4.1 mmol) diluted with 15 mL of anhydrous tetrahydrofuran was cooled to 0° C. and treated dropwise with a solution of 2-[(3-methoxyphenyl)thio]diethylbenzamide (0.4 g, 1.4 mmol) in 3 mL of anhydrous tetrahydrofuran. The reaction mixture was warmed to ambient and stirred for 2 h. Methanol (1 mL) was added, and the resulting solution was washed twice with water, and then with brine. The solution was dried ($Na_2SO_4$) and the solvent was removed at reduced pressure to deposit a yellow solid. This crude product was recrystallized from methanol to provide 0.15 g (45% of theory) of a yellow solid. $^1H$ NMR ($CDCl_3$): δ 4.00 (s, 3H), 7.92 (d, 1H), 7.12 (d, 1H), 7.50 (m, 4H), 8.45 (d, 1H).

Synthesis of 2-methoxythioxanthen-9-one (S-17)

First, 2-(4-methoxyphenylthio)benzoic acid was prepared. A stirred mixture of thiosalicylic acid (10.0 g, 65 mmol), 4-iodoanisole (15.18 g, 65 mmol), potassium carbonate (19.72 g, 143 mmol), copper powder (0.82 g, 13 mmol), and N-methylpyrrolidinone (100 mL) was deaerated by sparging with nitrogen for 10 min, heated at 165° C. for 18 h, and then cooled to ambient. The reaction mixture was poured onto a mixture of 500 g of ice plus 40 mL or concentrated HCl. The resulting precipitate was collected, washed with water, and dried. The product was purified by recrystallization from a mixture of water, ethanol, and tetrahydrofuran. A white powder was obtained, mass: 12.06 g (71% of theory).

Finally, 2-methoxythioxanthen-9-one (S-17) was prepared. To a mixture of 2-(2-methoxyphenylthio)benzoic acid (11.0 g, 42 mmol) and 43.1 g (423 mmol) of acetic anhydride was added dropwise 4.14 g (42 mmol) of concentrated sulfuric acid. The mixture was heated at 80° C. for 4 h, cooled to ambient, and poured very slowly onto 500 g of ice. The precipitate was extracted with dichloromethane, and the extract was washed with 10% aqueous $NaHCO_3$ and then with brine. The solution was dried ($MgSO_4$), passed through a short column of silica gel, and concentrated to deposit an orange solid. The product was purified by successive recrystallizations from isopropanol and from toluene/heptane. $^1H$ NMR (CDCl$_3$): δ 3.95 (s, 3H), 7.27 (dd, 1H), 7.5 (m, 2H), 7.6 (m, 2H), 8.09 (d, 1H), 8.64 (d 1H).

Synthesis of 3-methoxythioxanthen-9-one (S-18)

First, 2-(3-methoxyphenylthio)benzoic acid was prepared. A stirred mixture of thiosalicylic acid (3.57 g, 23 mmol), 3-iodoanisole (5.42 g, 23 mmol), potassium carbonate (7.04 g, 51 mmol), copper powder (0.29 g, 5 mmol), and N-methylpyrrolidinone (75 mL) was deaerated by sparging with nitrogen for 10 min, heated at 165° C. for 2 h, and then cooled to ambient. The reaction mixture was poured onto a mixture of 500 g of ice plus 40 mL of concentrated HCl. The resulting precipitate was collected, washed with water, and dried. The precipitate was dissolved in acetone and filtered through Celite, then concentrated to deposit a crude product. The product was purified by recrystallization from aqueous ethanol. A tan powder was obtained, mass: 4.60 g (76% of theory).

Finally, 3-methoxythioxanthen-9-one (S-18) was prepared. To a mixture of 2-(3-methoxyphenylthio)benzoic acid (4.60 g, 18 mmol) and 27 g (265 mmol) of acetic anhydride was added dropwise 1.70 g (18 mmol) of methanesulfonic acid. The mixture was heated at reflux for 2 h, cooled to ambient, and poured very slowly onto 250 g of ice. The crude product was extracted with dichloromethane, and the extract was washed with 10% aqueous NaHCO$_3$ and then with brine. The solution was dried (MgSO$_4$), passed through a short column of silica gel, and concentrated to deposit an orange solid. The product was purified by successive recrystallizations from toluene/heptane and from isopropanol to provide 1.57 g (37% of theory) of a yellow powder. $^1$H NMR (CDCl$_3$): δ 3.91 (s, 3H), 6.95 (d, 1H), 7.01 (dd, 1H), 7.4-7.6 (m, 3H), 8.55 (d, 1H), 8.59 (d, 1H).

Synthesis of 4-methoxythioxanthen-9-one (S-19)

This compound was prepared by the procedure for 2-methoxythioxanthen-9-one (S-17). First, the intermediate 2-(2-methoxyphenylthio)benzoic acid was prepared and purified by recrystallization from aqueous ethanol to provide a white powder in 64% yield. $^1$H NMR ((CD$_3$)$_2$CO): δ 3.76 (s, 3H), 6.71 (d, 1H), 7.04 (t, 1H), 7.16 (t, 2H), 7.29 (t, 1H), 7.5 (m, 2H), 8.01 (d, 1H).

Finally, 4-methoxythioxanthen-9-one (S-19) was prepared and purified by recrystallization from isopropanol and then from toluene/heptane. $^1$H NMR (CDCl$_3$): δ 4.05 (s, 3H), 7.14 (d, 1H), 7.5 (m, 2H), 7.65 (m, 2H), 8.27 (d, 1H), 8.61 (d 1H).

Synthesis of propyl thioxanthen-9-one-2-carboxylate (S-20)

First, 2,4'-thiobis(benzoic acid) was prepared. A mixture of 4-iodobenzoic acid (55.7 g, 225 mmol), thiosalicylic acid (34.6 g, 225 mmol), copper powder (15 g, 236 mmol), zinc powder (3 g, 46 mmol), and 2.5 M aqueous sodium hydroxide (400 mL) was heated at reflux for 5 h and then cooled to ambient. The reaction mixture was filtered, and the filtrate was acidified with concentrated HCl. The precipitate was collected and washed with water, then dissolved and filtered. The filtrate was concentrated to deposit 2,4'-thiobis(benzoic acid), mass 50 g (81% of theory).

Next, thioxanthen-9-one-2-carboxylic acid was prepared. A mixture of 2,4'-thiobis(benzoic acid) (50 g, 182 mmol) and methansulfonic acid (600 mL) was heated at 85° C. for 5 h and then cooled to ambient. The reaction mixture was poured onto ice, and the resulting precipitate was collected, washed with water, and dried.

Finally, propyl thioxanthen-9-one-2-carboxylate (S-20) was prepared. Thioxanthen-9-one-2-carboxylic acid (35 g, 137 mmol) was suspended in a mixture of toluene (250 mL), n-propanol (250 mL), and concentrated sulfuric acid (2 mL) and heated at reflux with stirring for 3 d. The reaction mixture was concentrated, and the resulting solid residue was washed with water and dried. The product was purified by recrystallization from heptane to provide 26.6 g (65% of theory) of a pale yellow solid.

Synthesis of (2-methacryloxyethyl)thioxanthen-9-one-2-carboxylate (S-21)

A mixture of thioxanthen-9-one-2-carboxylic acid (3.8 g, 19.8 mmol), 2-hydroxyethylmethacrylate (7.7 g, 59.3mmol), 4-dimethylamino-pyridine p-toluenesulfonic acid salt (2.3 g, 7.9mmol), and anhydrous dichloromethane (31 mL) is cooled to 0° C. under nitrogen and treated with 1,3-dicyclohexyl-carbodiimide (2.1 g, 10.1 mmol). After 15 min, the reaction mixture was warmed to ambient and stirred for 12 h. The precipitated urea by product was filtered, and the filtrate was washed successively with 10% aqueous HCl, 10% aqueous NaHCO$_3$, water, and brine. The solution was dried (Na$_2$SO$_4$) and concentrated to deposit yellow oil. The product was purified by column chromatography to provide 500 mg of a pale yellow solid (17% of theory). $^1$H (CDCl$_3$): δ 1.99 (s, 3H), 4.60 (dd, 4H), 5.60 (s, 1H), 6.20 (s, 1H), 7.60 (m, 4H), 8.20 (d, 1H), 8.70 (d, 1H), 9.30 (s, 1H).

Synthesis of 2-(1-naphthoyloxy)ethyl methacrylate (CS-20)

A mixture of 1-napthoic acid (8.0 g, 46 mmol), 2-hydroxyethylmethacrylate (18.1 g, 139 mmol), dimethylamino-pyridine p-toluenesulfonic acid salt (5.5 g, 19 mmol), and anhydrous dichloromethane (45 mL) was cooled to 0° C. under nitrogen, and 1,3-dicyclohexyl-carbodiimide (12.5 g, 60 mmol) were added. After 15 min, the reaction mixture was warmed to ambient and stirred for 3 h. The precipitated urea by-product was filtered, and the filtrate was washed successively with 10% aqueous HCl, 10% aqueous NaHCO$_3$, water, and brine. The organic layer was dried (Na$_2$SO$_4$) and concentrated to deposit a gold oil. The product was purified by column chromatography to provide 8.2 g (62% of theory) of a pale yellow oil. $^1$H NMR (CDCl$_3$): δ 1.90 (s, 3H), 1.55 (m, 2H), 1.70 (m, 2H), 5.60 (s, 1H), 6.20 (s, 1H), 7.55 (m, 3H), 7.90 (d, 1H), 8.05 (d, 1H), 8.20 (d, 1H), 8.90 (d, 1H).

Synthesis of 2-(1-naphthyl)ethyl methacrylate (CS-21)

A solution of 2-(1-naphthy)ethanol (30.0 g, 174 mmol), triethylamine (24.2 g, 239 mmol), 4-(dimethylamino)pyridine (1.1 g, 9.1 mmol), and dichloromethane (500 mL) was treated dropwise under nitrogen with methacryloyl chloride (18.9 g, 181 mmol), and then heated at refluxed for 4 h. The reaction mixture was cooled to ambient and diluted with diethyl ether. The solution was filtered and the filtrate was washed twice with water, once with NaHCO$_3$, and once with brine. The solution was dried (Na$_2$SO$_4$) and concentrated to deposit a yellow oil. The product was purified by distillation at reduced pressure, collecting the fraction bp 120-125° C./0.08 mm to provide a colorless oil, mass: 36.0 g (86% theory). $^1$H (CDCl$_3$): δ 2.00 (s, 3H), 3.50 (t, 2H), 4.55 (t, 2H), 5.60 (s, 1H), 6.15 (s, 1H), 7.50 (m, 4H), 7.8 (d, 1H), 7.9 (d, 1H), 8.2 (d, 1H).

Synthesis of dibutyl 4,4'-biphenyldicarboxylate (CS-6)

A mixture of biphenyl-4,4'-dicarboxylic acid (15.2 g, 63 mmol), 100 mL of n-butanol, 200 mL of toluene, and a catalytic amount of p-toluenesulfonic acid was heated at reflux with continuous separation of evolved water (Dean-Stark trap) for 7 d. The reaction mixture was cooled to ambient, diluted with dichloromethane, filtered, washed with 10% aqueous $NaHCO_3$ then with brine, dried ($MgSO_4$), and concentrated. The crude product was purified by recrystallization from heptane to obtain 13.4 g (60% of theory) of colorless crystals. $^1H$ NMR ($CDCl_3$): δ 0.97 (t, 6H), 1.5 (m, 4H), 1.8 (m, 4H), 4.35 (q, 4H), 7.68 (d, 4H), 8.13 (d, 4H).

Synthesis of dibutyl 4,4'-terphenyl dicarboxylate (CS-13)

First, butyl 4-iodobenzoate was prepared by the procedure for dibutyl 4,4'-biphenyldicarboxylate (CS-6), using 25.0 g (101 mmol) of 4-iodobenzoic acid, 29.9 g (403 mmol) of n-butanol, 100 mL of toluene, and 1.0 g of p-toluenesulfonic acid. The product was purified by vacuum distillation, collecting the fraction bp 110-116° C./0.2 mm. A colorless oil was obtained, mass: 29.88 g (97% of theory). $^1H$ NMR ($CDCl_3$): δ 0.97 (t, 3H), 1.5 (m, 2H), 1.8 (m, 2H), 4.31 (q, 2H), 7.76 (m, 4H).

Finally, dibutyl 4,4'-terphenyl dicarboxylate (CS-13) was prepared. A mixture of 1,4-benzene diboronic acid (1.00 g, 6.0 mmol), butyl 4-iodobenzoate (4.04 g, 13 mmol), sodium carbonate (1.92 g, 18 mmol), 1,2-dimethoxyethane (25 mL), ethanol (7 mL), and water (10 mL) was deaerated by sparing with nitrogen for 10 min. Dichlorobis(triphenylphosphine)-palladium(II) (0.085 g, 0.12 mmol) was added, and the sparging was continued for 5 min. The stirred reaction mixture was held at reflux under nitrogen for 44 h and then cooled to ambient. Dichloromethane (100 mL) and water (100 mL) were added. The organic layer was separated dried ($MgSO_4$), passed through a short column of silica gel to remove residual catalyst, and concentrated to deposit a crude product. The product was purified by column chromatography followed by recrystallization from heptane and then from acetonitrile. The product was obtained as white needles, mass: 1.45 g (56% of theory). $^1H$ NMR ($CDCl_3$): δ 1.00 (t, 6H), 1.5 (m, 4H), 1.8 (m, 4H), 4.36 (q, 4H), 7.75 (m, 8H), 8.13 (d, 4H).

Synthesis of dibutyl 3,3'-terphenyl dicarboxylate (CS-15)

This compound was prepared by the procedure for dibutyl 4,4'-terphenyl dicarboxylate (CS-13). The intermediate, butyl 3-iodobenzoate, was prepared and purified by vacuum distillation, collecting the fraction bp 104-108° C./0.2 mm. A colorless oil was obtained, mass: 26.17 g (85% of theory). $^1H$ NMR ($CDCl_3$): δ 0.98 (t, 3H), 1.5 (m, 2H), 1.8 (m, 2H), 4.32 (q, 2H), 7.18 (t, 1H), 7.88 (d, 1H), 8.00 (d, 1H), 8.36 (s, 1H).

Finally, dibutyl 4,4'-terphenyl dicarboxylate (CS-15) was prepared and purified by successive recrystallizations from heptane and from acetonitrile followed by column chromatography. $^1H$ NMR ($CDCl_3$): δ 1.00 (t, 6H), 1.5 (m, 4H), 1.8 (m, 4H), 4.37 (q, 4H), 7.54 (t, 4H), 7.74 (s, 4H), 7.83 (d, 2H), 8.04 (d, 2H), 8.33 (s, 2H).

Synthesis of butyl 4'-(trifluoromethyl)biphenyl-4-carboxylate (CS-16)

A mixture of butyl 4-iodobenzoate (3.5 g, 11 mmol), 4-trifluoromethylbenzene boronic acid (2.30 g, 12 mmol), potassium carbonate (4.77 g, 35 mmol), toluene (40 mL), and water (20 mL) was deaerated by sparging with nitrogen for 10 min. Tetrakis(triphenylphosphine)palladium(0) (0.27 g, 0.23 mmol) was added, and the mixture was heated at reflux for 3 h and then cooled to ambient. The organic layer was separated, washed with brine, dried ($MgSO_4$), passed through short column of silica gel, and concentrated to deposit a gold solid. The product was purified by recrystallization from aqueous isopropanol to provide 1.03 g (28% of theory) of a white powder. $^1H$ NMR ($CDCl_3$): δ 1.00 (t, 3H), 1.5 (m, 2H), 1.8 (m, 2H), 4.36 (t, 2H), 7.66 (d, 2H), 7.72 (s, 4H), 8.14 (d, 2H).

Synthesis of butyl 4'-(trifluoromethyl)biphenyl-3-carboxylate (CS-17)

This compound was prepared by the procedure for butyl 4'-(trifluoromethyl)biphenyl-4-carboxylate (CS-16), except using butyl 3-iodobenzoate instead of butyl 4-iodobenzoate. The product was purified by column chromatography followed by vacuum distillation, collecting fraction bp 127-131° C./0.12 mm. The product was a colorless oil, and obtained in 40% yield. $^1H$ NMR ($CDCl_3$): δ 0.99 (t, 3H), 1.5 (m, 2H), 1.8 (m, 2H), 4.37 (t, 2H), 7.54 (d, 2H), 7.72 (s, 4H), 7.77 (d, 2H), 8.09 (d, 2H), 8.28 (s, 2H).

Synthesis of 3-butoxycarbonyl-4'-trifluoromethyl-p-terphenyl (CS-18)

First, butyl 3-pinacolboronatobenzoate was prepared. A mixture of butyl 3-iodobenzoate (10.0 g, 33 mmol), triethylamine (9.98 g, 99 mmol), and toluene (50 mL) was deaerated by sparging with nitrogen for 10 min. Dichlorobis(triphenylphosphine)palladium(II) (0.23 g, 0.33 mmol) was added, and the mixture sparged with nitrogen for 5 min. Pinacolborane (6.31 g, 49 mmol) was added slowly, the stirred mixture was heated under argon at 80° C. for 4 h, and then cooled to ambient. Water (100 mL) was added dropwise, then the mixture was extracted with 100 mL of dichloromethane. The organic layer was washed with brine, dried ($MgSO_4$), and concentrated to deposit an oil. The product was purified by vacuum distillation, collecting the fraction bp 126-155° C./0.1 mm. A colorless oil was obtained, mass 6.74 g (67 of theory). $^1H$ NMR ($CDCl_3$): δ 0.98 (t, 3H), 1.35 (s, 12H), 1.5 (m, 2H), 1.75 (m, 2H), 4.33 (t, 2H), 7.44 (t, 1H), 7.99 (d, 1H), 8.13 (d, 1H), 8.47 (s, 1H).

Next, butyl 4'-bromobiphenyl-3-carboxylate was prepared. A mixture of butyl 3-pinacolboronatobenzoate (5.0 g, 16 mmol), 4-iodobromobenzene (4.65 g, 16 mmol), potassium carbonate (6.82 g, 49 mmol), water (50 mL), and toluene (100 mL) was deaerated by sparging with nitrogen for 10 min. Tetrakis(triphenylphosphine)palladium(0) (0.38 g, 0.33 mmol) was added, the mixture was heated at reflux under argon for 17 h, and then cooled to ambient. The organic layer was separated, washed with brine, dried ($MgSO_4$), passed through short column of silica gel, and concentrated to deposit a gold solid. The product was purified by column chromatography followed by successive recrystallizations from aqueous isopropanol and from heptane to provide 1.83 g (33% of theory) of a white powder. $^1H$ NMR ($CDCl_3$): δ 0.99 (t, 3H), 1.5 (m, 2H), 1.8 (m, 2H), 4.36 (t, 2H), 7.50 (m, 3H), 7.59 (d, 2H), 7.74 (d, 1H), 8.03 (d, 1H), 8.23 (s, 1H).

Finally, 3-butoxycarbonyl-4'-trifluoromethyl-p-terphenyl (CS-18) was prepared. A mixture of butyl 4'-bromobiphenyl-3-carboxylate (1.80 g, 5.4 mmol), 4-trifluoromethylbenzene boronic acid (1.08 g, 5.7 mmol), potassium carbonate (2.24 g, 16 mmol), toluene (30 mL), and 18-crown-6 (20 mg) was deaerated by sparging with nitrogen for 10 min. Tetrakis (triphenylphosphine)-palladium(0) (0.12 g, 0.11 mmol) was added, and the mixture was heated at reflux for 44 h. Additional tetrakis(triphenylphosphine)palladium(0) (0.10 g, 0.10 mmol) was added, and the reaction was continued for 24 h. The mixture was cooled to ambient, and toluene (30 mL) and water (30 mL) were added. The organic layer was separated, washed with water and with brine, dried ($MgSO_4$), passed through short column of silica gel, and concentrated to deposit a gold solid. The product was purified by column chromatography followed by recrystallization from heptane to provide 0.96 g (45% of theory) of a white powder. $^1$H NMR ($CDCl_3$): δ 1.00 (t, 3H), 1.5 (m, 2H), 1.8 (m, 2H), 4.36 (t, 2H), 7.51 (t, 1H), 7.7 (m, 8H), 7.80 (d, 1H), 8.03 (d, 1H), 8.30 (s, 1H).

Synthesis of dibutyl biphenyl 3,4'-dicarboxylate (CS-19)

A mixture of butyl 3-pinacolboronatobenzoate (5.00 g, 16 mmol), 4-iodobromobenzene (5.00 g, 16 mmol), potassium carbonate (6.82 g, 49 mmol), 18-crown-6 (10 mg), 1,2-dimethoxyethane (35 mL) and n-butanol (15 mL) was deaerated by sparging with nitrogen for 10 min. Dichlorobis(triphenylphosphine)-palladium(II) (0.23 g, 0.33 mmol) was added. The mixture was heated at reflux for 72 h under argon, and then cooled to ambient. Water (50 mL) and ether (50 mL) were added. The organic layer was separated, washed with water and with brine, dried ($MgSO_4$), and concentrated. The residue was dissolved in hexane. The solution passed through short column of silica gel, and concentrated to deposit a gold oil. The product was purified by column chromatography followed by vacuum distillation, collecting the fraction bp 150-165° C./0.06 mm. A colorless oil was obtained, mass 1.40 g (24% of theory). $^1$H NMR ($CDCl_3$): δ 0.99 (t, 6H), 1.5 (m, 4H), 1.8 (m, 4H), 4.35 (t, 4H), 7.5 (m, 1H), 7.65 (dd, 2H), 7.77 (d, 1H), 8.03 (dd, 1H), 8.11 (dd, 2H), 8.27 (s, 1H).

Example 1

Illustration of Optical Recording Elements of the Invention and Improvements in Quantum Yields and Percent Conversions with Various Cosensitizers Solutions containing 100 mg of dewarbenzene R-6 (10%), 50 mg (5%) of additive (see Table 4), 5.8 mg of sensitizer S-2, and 850 mg of poly(methyl methacrylate) (PMMA) in 4.0 mL of dichloromethane were prepared and filtered through a 0.45 μm polytetrafluorethylene membrane. The solutions were coated on poly(ethylene terephthalate) support at 25° C. using a 127 μm coating knife. The samples were air-dried for 15 min and then at 40° C. for 17 h in a vacuum oven. The dried films were 23±2 μm thick. The optical densities at 405 nm were in the range of 0.4 to 0.5. The films were irradiated for 1, 2, 4, 8 and 30 min using strongly defocused light from a high-pressure Mercury lamp filtered through Corning 5-58 and 3-75 broad band and cutoff filters and through a 404.7 nm interference filter. The irradiated films were then extracted with tetrahydrofuran and analyzed by high performance liquid chromatography (HPLC). The irradiation intensity (5.7× $10^{-8}$ Einstein/min/cm$^2$) that was used in the quantum yield calculations was determined using 9,10-phenanthrenequinone/trans-stilbene actinometry. (*J. Am Chem. Soc.* 100, 4162 (1978).)

Both the dewarbenzene reactant levels and the benzene product levels can be determined via HPLC and used to calculate the quantum yields and percent conversion data in Table 4, below. The quantum yields in Table 4 were determined at 10-15% conversion of R-6 to product. The percent conversion data in Table 4 were determined on samples given prolonged exposure (30 min). Percentages represent average values with a variation of 3%. The triplet energies of the cosensitizer additives in Table 4 were determined by phosphorescence measurements at 77° K and/or by measurements of equilibria with triplets of known energy using laser photolysis.

TABLE 4

| Additive | Triplet Energy (kcal/mole) | Quantum Yield | % Conversion (30 min irradiation) |
|---|---|---|---|
| None | — | 1.3-1.4 | |
| Dibutyl Phthalate | 73 | 1.5-1.6 | 56 |
| CS-7 | 65.1 | 2.5 | 56 |
| CS-11 | 61.1 | 3.2 | 64 |
| CS-6 | 60.6 | 2.6 | 53 |
| CS-4 | 60.5 | 2.7 | 62 |
| CS-3 | 59.5 | 3.5 | 78 |
| CS-14 | 58.5 | 3.1 | 75 |
| CS-9 | 57.8 | 3.6 | 73 |
| CS-12 | 57.5 | 4.7 | 83 |
| CS-1 | 57.4 | 3.8 | 80 |
| CS-10 | 53.4 | 4.2 | 81 |
| CS-8 | 47.9 | 2.9 | 80 |

As shown by the data in Table 4, a plasticizer (dibutyl phthalate) improves the isomerization quantum yield, and all of the cosensitizers produce further increases in quantum yields and/or higher percent conversions than the plasticizer dibutyl phthalate. Cosensitizers with triplet energies close to that of the sensitizer S-2 (56 kcal/mole) tend to be the most effective.

Example 2

Illustration of the Effect of Dewarbenzene Reactant Concentration on Isomerization Quantum Efficiency Films containing various amounts of reactant R-6 together with sensitizer S-8 were prepared similarly to Example 1. The total weight of R-6 plus PMMA in the coated solutions was kept constant at 1.000 g/4.0 mL of dichloromethane. The film samples were coated, dried, irradiated and analyzed as in Example 1. The amounts of R-6 and the measured relative quantum yields of isomerization are listed in Table 5. The data illustrate the substantial increase in isomerization quantum efficiency as the reactant concentration is increased.

TABLE 5

| R-6 (g/1.000 g Total) | Efficiency |
|---|---|
| 0.016 | 0.07 |
| 0.080 | 0.66 |
| 0.100 | (1.00) |
| 0.160 | 2.04 |
| 0.200 | 2.85 |

Example 3

Illustration of the Effect of Dewarbenzene Reactant Concentration on Isomerization Quantum Efficiency with Added Plasticizer Films containing various amounts of reactant R-6 together with sensitizer S-2 and plasticizer dibutyl phthalate were prepared similarly to Example 1. The total weight of the three coated components was held constant at 1.000 g/4 mL of dichloromethane solvent. The films were coated, dried, irradiated and analyzed as in Example 1. The coated amounts of R-6 and dibutyl phthalate and the relative efficiencies of isomerization are listed in Table 6. These data illustrate that the effect of reactant concentration is more than just a plasticization effect.

TABLE 6

| R-6 (g/1.00 g Total) | Dibutyl Phthalate (g./1.00 g) | Relative Efficiency |
|---|---|---|
| 0.05 | 0.10 | (1.0) |
| 0.10 | 0.05 | 2.2 |
| 0.15 | 0.00 | 3.4 |

Example 4

An Optical Recording Element of this Invention Containing a High Concentration of Sensitizer A film was prepared similar to those of Example 1, by coating a solution containing 150 mg of reactant R-6, 120 mg of sensitizer S-4, 80 mg of cosensitizer CS-4 and 1.00 g of poly(methyl methacrylate) (PMMA) in 4.0 mL of dichloromethane using a 127 µm coating knife. The film was air-dried for 15 min and then at 40° C. for 4 hours in a vacuum oven. Since sensitizer S-4 has a relatively low extinction coefficient at the irradiation wavelength of 405 nm, it is coated at a much higher level than S-2 in Example 1. Such a high level of sensitizer aids in the transport of triplet energy and improves quantum yields and percent conversions. The optical density at 405 nm was approximately 0.5. Film samples were irradiated for 20 s and for 1, 2, 4 and 5 min at 405 nm using filtered light from a high pressure Mercury lamp ($2 \times 10^{-7}$ Einstein/min/cm$^2$). The irradiated films were then extracted with tetrahydrofuran and analyzed by high performance liquid chromatography (HPLC). The intensity of the irradiation light was measured using phenanthrene-quinone/stilbene actinometry to determine absolute quantum yields. The quantum yield at 34% conversion (20 sec irradiation) was determined to be 8, and the percent conversion at 5 min irradiation was 98%, illustrating the high efficiency of the triplet chain isomerization process.

Example 5

An Optical Recording Elements of this Invention Containing a Polymeric Cosensitizer Films were prepared similarly to those of Example 1 by coating solutions containing 100 mg of Reactant R-6, 5.8 mg of sensitizer S-2 and 850 mg of either (A) poly(methyl methacrylate) or (B) poly(1-vinylnaphthoate) in 4.0 mL of dichloromethane using a 127 µm coating knife. Films were dried, irradiated at 405 nm and analyzed as in Example 1 to determine quantum yields as well as percent conversions under prolonged irradiation. The quantum yield at 10-15% conversion for A was only 1.3, while that for the cosensitizer polymer B was 9.8. Furthermore, the percent conversion to product after 30 min of irradiation was 98% for cosensitizer polymer poly(1-vinylnaphthoate) (B) but only about 25% for the comparison polymer poly(methyl methacrylate) (A). These results show that the presence of a suitable polymeric cosensitizer greatly increases the quantum yield and the conversion efficiency.

Example 6

Illustration of the Effect of Cosensitizer Concentration on Isomerization Quantum Efficiency Films containing 10 weight percent of reactant R-6 together with sensitizer S-2 and various amounts of cosensitizer in PMMA were prepared similarly to Example 1. The film samples were coated, dried, irradiated and analyzed as in Example 1. The weight percents of cosensitizers CS-1 and CS-8 used in these films and the measured quantum yields of isomerization of R-6 are given in Table 7. It is evident from the data in Table 7 that increasing the amount of cosensitizer can greatly enhance isomerization efficiency, particularly with a cosensitizer like CS-1 that has a triplet energy in the preferred range.

TABLE 7

| Cosensitizer (Weight %) | Quantum Yield |
|---|---|
| None | 1.4 |
| CS-1 (3%) | 2.7 |
| CS-1 (5%) | 3.8 |
| CS-1 (8%) | 5.8 |
| CS-8 (3%) | 2.2 |
| CS-8 (5%) | 3.0 |

Example 7

Optical Recording Elements of the Invention with Different Sensitizers

This example illustrates that sensitizers with absorption in different spectral regions and with different triplet energies can effectively sensitize isomerization via triplet energy transfer to reactant. Coatings of reactant R-6 together with various sensitizers in PMMA were prepared, irradiated and analyzed as in Example 1. The sensitizers used are listed in Table 8. The measured quantum efficiencies for all of the sensitizers were the same within 20%. The absorption maxima and the long-wavelength absorption onsets of some of the films are listed in Table 8 along with triplet energies.

TABLE 8

| Sensitizer | Absorption Maximum (nm) | Absorption Onset (nm) | Triplet Energy (kcal/mole) |
|---|---|---|---|
| S-5 | ~460 | ~510 | 50.5 |
| S-10 | ~390 | ~430 | 56 |
| S-2 | ~380 | ~430 | 56 |
| S-8 | | | 56.5 |
| S-4 | | | 57.5 |
| S-9 | | | ~61 |
| S-1 | | | 62 |

Example 8

Comparative Isomerization Efficiencies with Triplet Chain Isomerization and Electron Transfer Isomerization This example illustrates the advantage of the triplet chain isomerization process of this invention over an electron transfer chain isomerization process of the prior art. Films for this comparison were prepared, irradiated and analyzed similarly to Example 1. Films had similar optical densities at the irradiation wavelength of 405 nm. For electron transfer isomerization, films of reactant R-1 (the most efficient for the electron transfer process) at 0.5 M were coated in PMMA with the electron transfer sensitizer 9,10-dicyanoanthracene or the electron transfer sensitizer 2-t-butyl-9,10-dicyanoanthracene. These sensitizers are among the most effective for the electron transfer sensitized isomerization process. The electron transfer films showed isomerization quantum yields of only about 0.4 and gave maximum conversions after prolonged irradiation of 40%. In contrast, a triplet isomerization film of this invention consisting of 0.4 M R-6 together with 5% CS-1 and the sensitizer S-2 in PMMA gave a quantum yield of 3.8 and a maximum conversion of 80%. A triplet isomerization film of this invention consisting of 0.4 M R-6 together with sensitizer S-2 in poly(1-vinylnaphthoate) gave an isomerization quantum yield of 9.8 and a maximum conversion of 98%.

Example 9

Optical Recording Elements with Different Dewarbenzene Reactants

This example compares the efficiency of two different dewarbenzene reactants. Films containing either reactant R-2 or R-6 at equal concentrations (0.45 moles/kg) were prepared with sensitizer S-8 in PMMA, similarly to Example 1. Both films had optical densities of 0.5 at 405 nm. The films were irradiated and analyzed as in Example 1. The relative quantum yields for isomerization were 1.0 and 2.2 with R-2 and R-6, respectively.

Example 10

Optical Recording Elements with Reactant R-2

Reactant R-2 is preferred in some applications because of its superior thermal stability. This example illustrates optical recording elements containing R-2 that provide high quantum efficiencies for isomerization. Films containing reactant R-2 at 10 weight percent together with sensitizer S-1 and various cosensitisers in PMMA were prepared similarly to Example 4. Films were irradiated at 405 nm and analyzed as in Example 4. The measured quantum yields for isomerization at 15-30 percent conversions are listed in Table 9.

TABLE 9

| Cosensitizer (Weight %) | Quantum Yield |
|---|---|
| CS-1 (10) | 2.7 |
| CS-2 (10) | 3.5 |
| CS-4 (5) | 4.0 |
| CS-4 (10) | 7.2 |

Example 11

Additional Optical Recording Elements with Reactant R-6 Sensitizer S-1 and Various Cosensitizers Solutions containing 100 mg of reactant R-6, 850 mg of PMMA, 35-40 mg of sensitizer S-1, and 50 mg of cosensitizer (see Table 10) in 4 mL dichloromethane were prepared and filtered through a 0.45 μm polytetrafluoroethylene membrane. The solutions were coated on poly(ethylene terephthalate) support at 25° C. using a 127 μm coating knife. The samples were air-dried for 15 min and then at 40° C. for 17 h in a vacuum oven. The optical densities at 405 nm were 0.4±0.05. The films were irradiated for 0.5, 1, 2, 4, and 30 min using strongly defocused light from a high pressure Mercury lamp filtered through Corning 5-58 and 3-75 broad band and cutoff filters and through a 404.7 nm interference filter. The irradiated films were then extracted with tetrahydrofuran and analyzed by high performance liquid chromatography (HPLC). The irradiation intensity was $5.7 \times 10^{-8}$ Einstein/min/cm$^2$.

The quantum yields reported in Table 10 were measured at the 10-15% conversion level (0.5 to 2 min of irradiation). The margin of error in the quantum yields is approximately ±0.2. The percent conversions in Table 10 were measured after 30 min of irradiation.

TABLE 10

| Cosensitizer | Triplet Energy (kcal/mole) | Quantum Yield | % conv (30 min) |
|---|---|---|---|
| Dibutl Phthalate[a] | 73 | 2.9 | 78 |
| CS-7 | 65.1 | 3.3 | 80 |
| CS-11 | 61.1 | 4.3 | 92 |
| CS-6 | 60.6 | 2.8 | 80 |
| CS-4 | 60.5 | 5.0 | 93 |
| CS-3 | 59.5 | 4.2 | 93 |
| CS-14 | 58.5 | 3.6 | 90 |
| CS-12 | 57.5 | 4.5 | 95 |
| CS-1 | 57.4 | 4.5 | 94 |

[a] used as a control to test the plasticizing effect.

Example 12

Optical Recording Elements with Cosentitizer Covalently Attached to the Polymeric Binder (A) Solutions containing 100 mg of Reactant R-2, 860 mg of naphthyl-functionalized copolymer P1 or P2 (below, where x and y refer to fractions by weight, derived from copolymerization of cosensitizer CS-21 with methyl methacrylate) and 41 mg of S-1 sensitizer in 4 mL dichloromethane were prepared and filtered through a 0.45 μm polytetrafluoroethylene membrane. The solutions were coated, dried, irradiated and analyzed as in Example 1. The optical density due to the sensitizer absorption at 405 nm was approximately 0.4. The quantum yields reported in Table 11 were measured at 10-15% conversion (0.5 to 2 min of irradiation). The percent conversions in Table 11 were measured after 30 min of irradiation.

TABLE 11

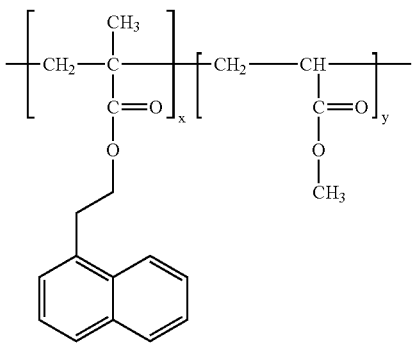

| Polymer | x | y | $T_g$ (° C.) | Quantum Yield | % conv (30 min) |
|---|---|---|---|---|---|
| P1 | 0.2 | 0.8 | 85 | 7.3 | 99 |
| P2 | 0.3 | 0.7 | 90 | 8.6 | 100 |

(B) Similarly, solutions containing 100 mg of reactant R-6, 900 mg of a naphthoate-functionalized copolymer P3, P4 or P5 (below, where x and y refer to fractions by weight), 5.8 mg of sensitizer S-2 in 4 mL dichloromethane were prepared, filtered, coated, dried, irradiated and analyzed as in Example 1. The optical densities at 405 nm were 0.45±0.05. The quantum yields given in Table 12 were measured at 10-15% conversion, and the percent conversions in Table 12 refer to 30 min of irradiation.

Isomerization quantum yields as high as 16 were obtained in these optical recording elements in which the cosensitizer is covalently attached to the polymeric binder. Polymer glass transition temperatures ($T_g$) are also given in Tables 11 and 12.

TABLE 12

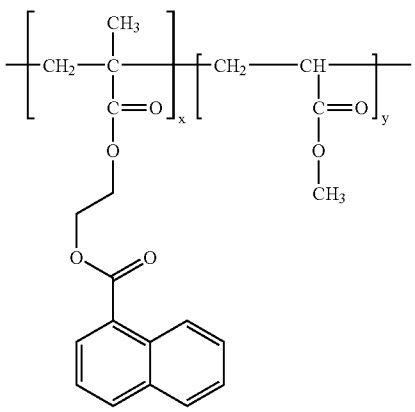

| Polymer | x | y | $T_g$ (° C.) | Quantum Yield | % conv (30 min) |
|---|---|---|---|---|---|
| P3 | 0.2 | 0.8 | 90 | 5.4 | 84 |
| P4 | 0.5 | 0.5 | 55 | ~16 | 99 |
| P5 | 1.0 | 0.0 | 56 | ~16 | 99 |

Example 13

Optical Recording Elements with Reactant R-8

Reactant R-8 is also a preferred embodiment because of its superior thermal stability. The following data illustrate the performance of optical recording elements containing R-8.

Solutions containing 100 mg of Reactant R-8, 850 mg of PMMA, 35 mg of sensitizer S-1 and 50 mg of cosensitizer (see Table 13) in 4 mL dichloromethane were prepared and filtered through a 0.45 μm polytetrafluoroethylene membrane. The solutions were coated and dried as in Example 1. The optical densities at 405 nm were in the range of 0.3±0.02. The films were irradiated and analyzed as in Example 1.

The quantum yields reported in Table 13 were measured at 10-15% conversion (0.5 to 2 min irradiation), and the percent conversions were measured after 30 min of irradiation.

TABLE 13

| Cosensitizer | Triplet Energy (kcal/mol) | Quantum Yield | % conv (30 min) |
|---|---|---|---|
| Dibutyl Phthalate[a] | 73 | 1.5 | 62 |
| CS-7 | 65.1 | 2.4 | 68 |
| CS-11 | 61.1 | 4.3 | 87 |
| CS-4 | 60.5 | 3.9 | 87 |
| CS-3 | 59.5 | 2.7 | 81 |
| CS-1 | 57.4 | 3.8 | 87 |

[a] used as a control to test the plasticizing effect

Example 14

Diffraction Efficiencies vs. Exposure of Optical Recording Elements of this Invention Compared to Prior Art The optical recording elements and optical devices of this invention provide higher diffraction efficiencies and require lower exposures than similar elements or devices of the prior art. These advantages are illustrated in this example by comparison of diffraction efficiencies and exposure energies of elements of this invention with an element of the prior art that utilizes electron transfer sensitization to produce isomerization of dewarbenzene reactants.

Diffraction efficiency serves as a measure of information storage capacity of the optical recording elements of this invention and of the prior art. Films for the recording of diffraction efficiency vs. exposure were prepared similarly to those of Example 1. The compositions of the films, all coated in PMMA, are given below. Electron transfer sensitizer 2TBDCA used in the comparative example is 2-t-butyl-9,10-dicyanoanthracene.

| Film | Reactant (Concentration) | Sensitizer | Cosensitizer (Concentration) |
|---|---|---|---|
| 14A Invention | R-2 (0.43M) | S-2 | none |
| 14B Invention | R-2 (0.43M) | S-2 | CS-8 (5 weight %) |
| 14C Invention | R-2 (0.43M) | S-2 | CS-1 (5 weight %) |
| 14D Comparison | R-1 (0.50M) | 2TBDCA | none |

Diffraction gratings were written in the films using 407 nm light from a Coherent Innova 90 krypton ion laser. A Newport 835 power meter was used to measure optical power at 407 nm, which allows calculation of exposure energies from exposure times. A power of 0.5 mW/cm² was used to write gratings 14A, 14B and 14C of this invention, whereas a power of 2.0 mW/cm² was used to write grating 14 D of the less efficient recording element of the prior art. A write angle of 24.0° was used in the interferometer set up to give a grating period of 500 nm corresponding to a Bragg angle of 39.4°.

Holographic grating formation was monitored with 633 nm light from an MWK industries P5130NS1299 heliumneon laser. The intensity of the light diffracted by the film was measured with a silicon detector. The diffraction efficiency of the grating produced was determined from the ratio of the intensity of the first diffracted order from the grating to the intensity of the incident 633 nm probe beam.

Table 14 lists maximum diffraction efficiencies ($DE_{max}$), exposure energies in $J/cm^2$ ($EE_{max}$) required to produce $DE_{max}$ and diffraction efficiencies ($DE_{0.05}$) obtained after 0.05 J/cm2 of exposure. It is evident from the data in Table 14 that the recording elements of this invention can produce much higher diffraction efficiencies with much less exposure than elements of the prior art.

TABLE 14

| Film | $DE_{max}$ | $EE_{max}$ ($J/cm^2$) | $DE_{0.05}$ |
|---|---|---|---|
| 14A Invention | 0.001 | 0.04 | 0.0009 |
| 14B Invention | 0.0006 | 0.03 | 0.0005 |
| 14C Invention | 0.00003 | 0.02 | 0.00002 |
| 14D Comparison | 0.00015 | 0.40 | 0.000006 |

The invention has been described in detail with particular reference to certain preferred embodiments thereof, but it will be understood that variations and modifications can be effected within the spirit and scope of the invention.

What is claimed is:

1. An optical recording material comprising:
   a polymeric matrix;
   a dewarbenzene derivative reactant capable of undergoing isomerization to a benzene product upon triplet excitation, thereby causing a change in optical properties;
   a sensitizer capable of absorbing actinic radiation to cause triplet energy transfer to said reactant, wherein the algebraic sum of the excitation energy of said sensitizer and its reduction potential is at least 0.05 eV less than the oxidation potential of said reactant, thereby precluding one-electron oxidation of said reactant and said sensitizer has a triplet energy of at least 45 kcal/mol and an intersystem crossing quantum yield of at least 0.2; and
   a triplet cosensitizer with a triplet energy between 45 and 72 kcal/mol present in an amount that absorbs less than 10 percent of the actinic radiation absorbed by said sensitizer and increases the quantum yield of isomerization by a factor of at least 1.57.

2. The optical recording material of claim 1, wherein the overall quantum yield of said sensitized isomerization is at least 2.

3. The optical recording material of claim 1 wherein said polymeric matrix is formed by in-situ polymerization.

4. The optical recording material of claim 3, wherein said reactant is covalently attached to said polymeric matrix.

5. The optical recording material of claim 4, wherein said polymeric matrix is derived from monomers comprising reactants selected from the group consisting of

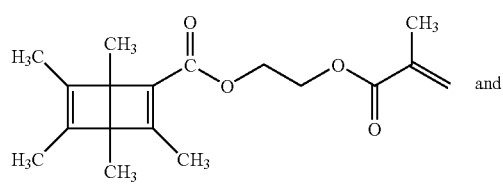

and

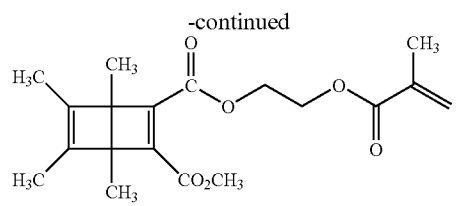

6. The optical recording material of claim 3, further comprising a sensitizer covalently attached to said polymeric matrix and said triplet cosensitizer is covalently attached to said polymeric matrix.

7. The optical recording material of claim 6, wherein said polymeric matrix is derived from monomers comprising the sensitizer

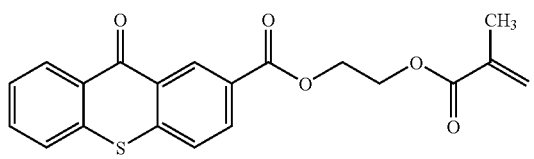

8. The optical recording material of claim 6, wherein said polymeric matrix is derived from monomers comprising cosensitizers selected from the group consisting of

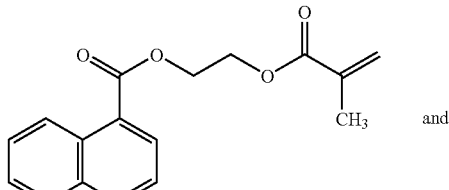 and

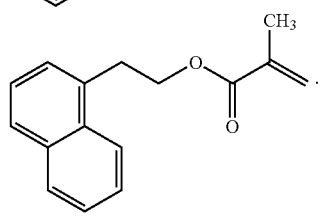

9. The optical recording material of claim 1, wherein said reactant is covalently attached to said polymeric matrix.

10. The optical recording material of claim 1, wherein said sensitizer is covalently attached to said polymeric matrix.

11. The optical recording material of claim 10, wherein said sensitizer comprises 0.01 to 90 percent by weight of said recording material.

12. The optical recording material of claim 1, wherein said cosensitizer is covalently attached to said polymeric matrix.

13. The optical recording material of claim 12, wherein said polymeric matrix comprises poly(vinylnaphthoate), poly (naphthylacrylate) or poly(vinylnaphthalene).

14. The optical recording material of claim 1 wherein said polymeric matrix comprises poly(alkyl methacrylate), poly (alkyl acrylate), polystyrene, polycarbonate, cellulose acetate, cellulose acetate butyrate or poly(vinyl butyral).

15. The optical recording material of claim 1, wherein said reactant comprises a dewarbenzene derivative substituted with one or more ester, amide, or aryl groups.

16. The optical device of claim 15, wherein said reactant is selected from the group consisting of:

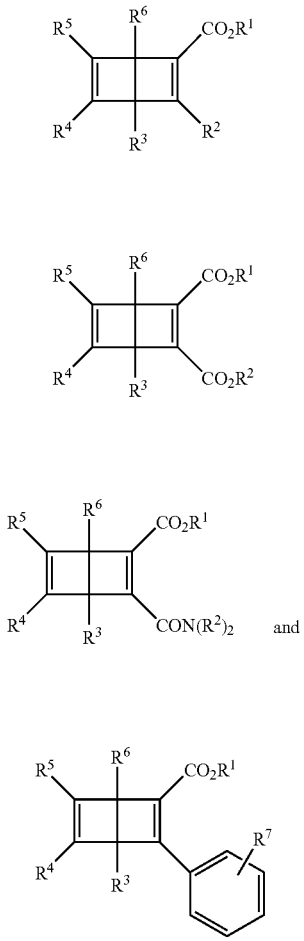

wherein $R^1$ and $R^2$ are individually selected from unsubstituted or substituted alkyl, phenyl or naphthyl groups, and $R^3$-$R^7$ are hydrogen atoms or alkyl groups.

17. The optical recording material of claim 15, wherein said reactant is selected from the group consisting of:

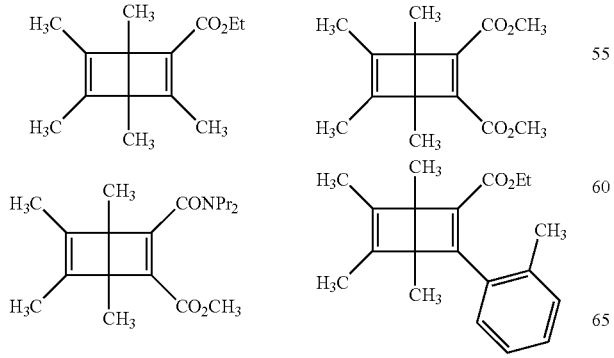

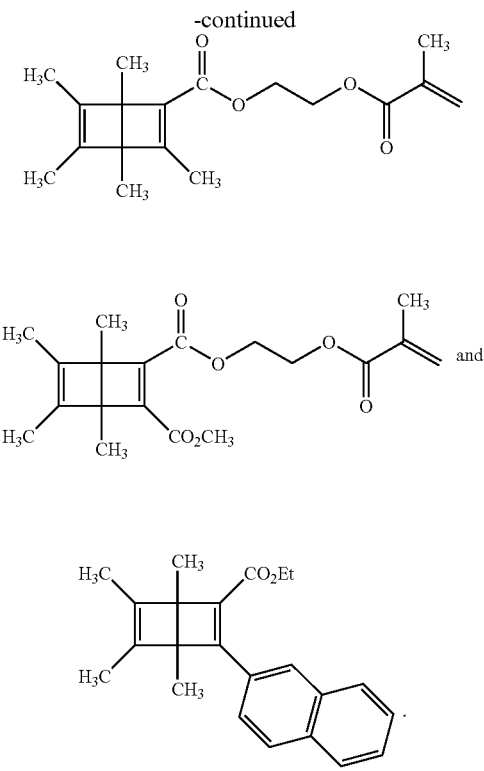

18. The optical recording material of claim 1, wherein said reactant comprises 2 to 80 percent by weight of said recording material.

19. The optical recording material of claim 1, wherein said sensitizer comprises a ketocoumarin, xanthone, thioxanthone, or benzophenone derivative.

20. The optical recording material of claim 19, wherein said sensitizer is selected from the group consisting of:

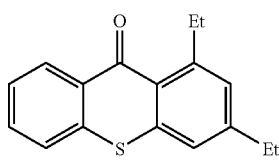

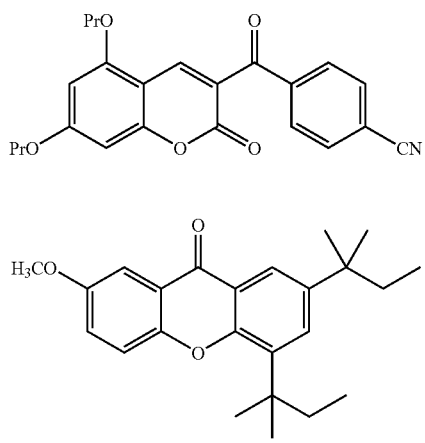

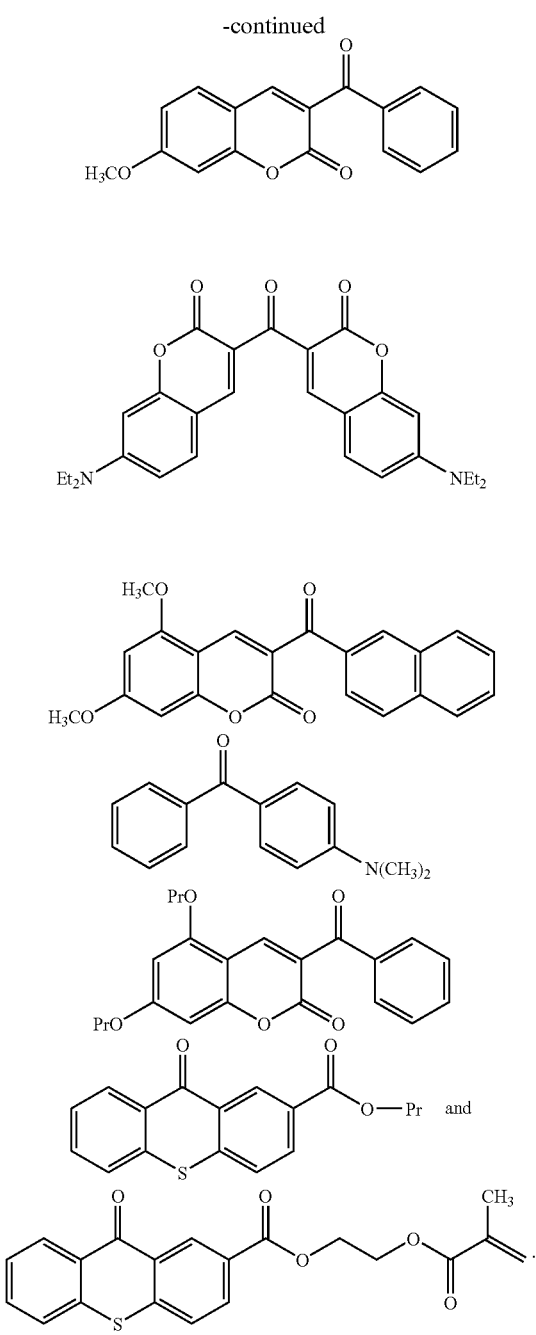

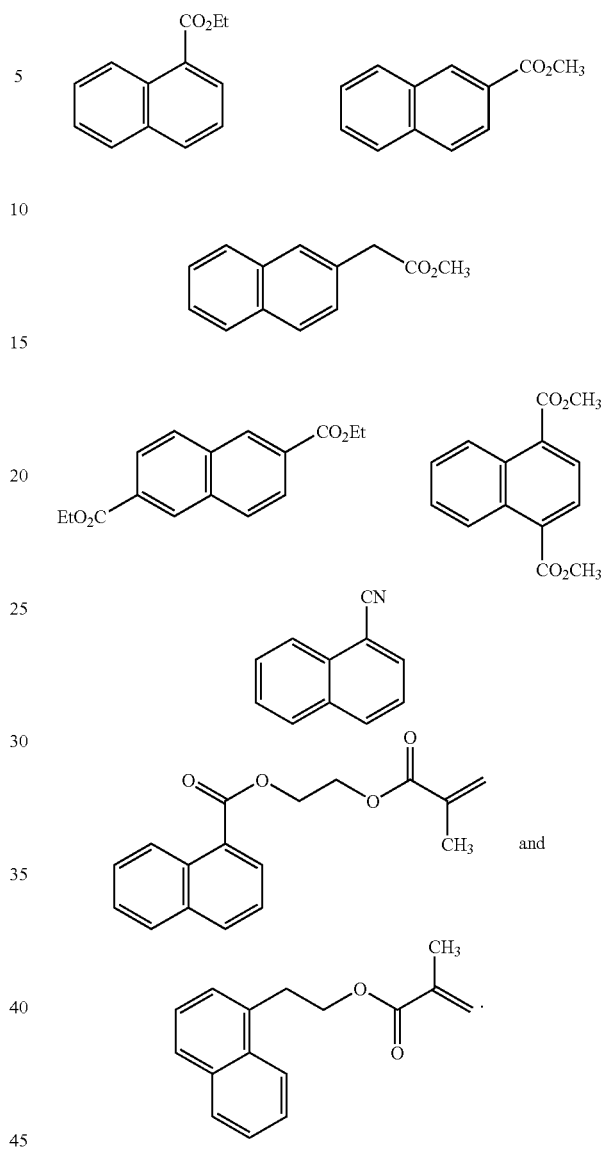

21. The optical recording material of claim 1, wherein said sensitizer has a triplet energy no more than 4 kcal/mole below the triplet energy of said reactant.

22. The optical recording material of claim 1, wherein said sensitizer comprises 0.002 to 20 percent by weight of said recording material.

23. The optical recording material of claim 1, wherein said cosensitizer has a triplet energy between 4 kcal/mole above the triplet energy of said sensitizer and 4 kcal/mole below the triplet energy of said reactant.

24. The optical recording material of claim 1, wherein said cosensitizer comprises a naphthalene derivative.

25. The optical recording material of claim 24, wherein said cosensitizer is selected from the group consisting of:

26. The optical recording material of claim 1, wherein said cosensitizer comprises from 1 to 90% by weight of said recording material.

27. The optical recording material of claim 1, further comprising a plasticizer.

28. The optical recording material of claim 1, wherein the change in optical properties comprises a change in refractive indices.

29. The optical recording material of claim 1 further comprising a support.

30. The optical recording material of claim 1 further comprising a protective overcoat layer.

31. An optical device comprising a dewarbenzene derivative reactant, a dewarbenzene product, and a triplet sensitizer in a polymeric matrix; wherein there are regions of varying concentrations of reactant and product corresponding to an optical pattern of intelligence that may be detected with light; wherein said reactant is capable of undergoing isomerization to said product upon triplet excitation, thereby producing said pattern of intelligence; wherein said sensitizer is capable of absorbing actinic radiation to cause triplet energy transfer to said reactant and wherein the algebraic sum of the excitation energy of said sensitizer and its reduction potential is at least 0.05 eV less than the oxidation potential of said reactant, and said sensitizer has a triplet energy of at least 45 kcal/mole and an intersystem crossing quantum yield of at least 0.2; and said optical device further comprises a triplet cosensitizer with a triplet energy between 45 and 72 kcal/mole present in an amount that absorbs less than 10 percent of the actinic radiation absorbed by said sensitizer and increases the quantum yield of isomerization by a factor of at least 1.57.

32. The optical device of claim 31 wherein said polymeric matrix is formed by in-situ polymerization.

33. The optical device of claim 32, wherein said reactant is covalently attached to said polymeric matrix.

34. The optical device of claim 33, wherein said polymeric matrix is derived from monomers comprising reactants selected from the group consisting of

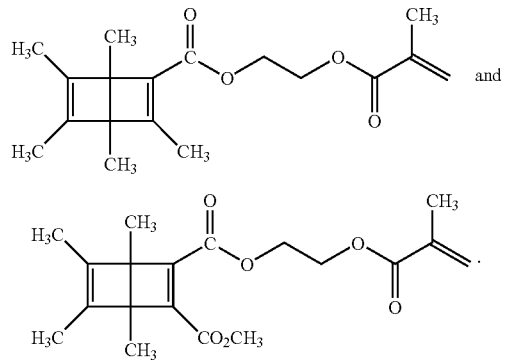

35. The optical device of claim 32, further comprising a sensitizer covalently attached to said polymeric matrix.

36. The optical device of claim 35, wherein said polymeric matrix is derived from monomers comprising the sensitizer

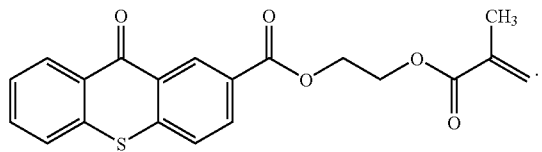

37. The optical device of claim 32, wherein said polymeric matrix is derived from monomers comprising cosensitizers selected from the group consisting of

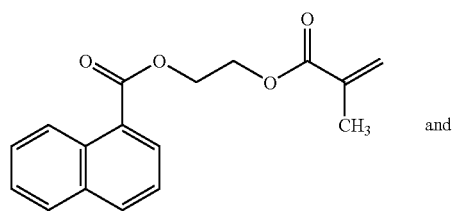

-continued

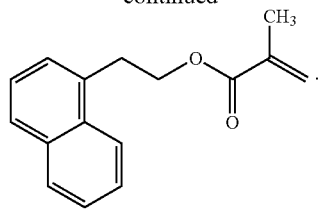

38. The optical device of claim 31, wherein said reactant and said product are covalently attached to said polymeric matrix.

39. The optical device of claim 31, wherein said sensitizer is covalently attached to said polymeric matrix.

40. The optical device of claim 39, wherein said sensitizer comprises 0.01 to 90 percent by weight of said recording material.

41. The optical device of claim 31, wherein said cosensitizer is covalently attached to said polymeric matrix.

42. The optical device of claim 41, wherein said polymeric matrix comprises poly(vinylnaphthoate), poly(naphthylacrylate) or poly(vinylnaphthalene).

43. The optical device of claim 31 wherein said polymeric matrix comprises poly(alkyl methacrylate), poly(alkyl acrylate), polystyrene, polycarbonate, cellulose acetate, cellulose acetate butyrate or poly(vinyl butyral).

44. The optical device of claim 31, wherein said reactant comprises a dewarbenzene derivative substituted with one or more ester, amide, or aryl groups.

45. The optical device of claim 44, wherein said reactant is selected from the group consisting of:

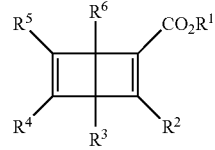

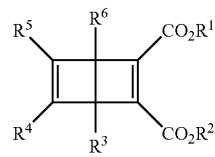

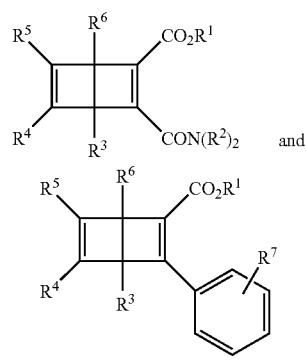

wherein $R^1$ and $R^2$ are individually selected from an alkyl, phenyl or substituted phenyl group, and $R^3$-$R^7$ are hydrogen atoms or alkyl groups.

46. The optical device of claim 45, wherein said reactant is selected from the group consisting of:

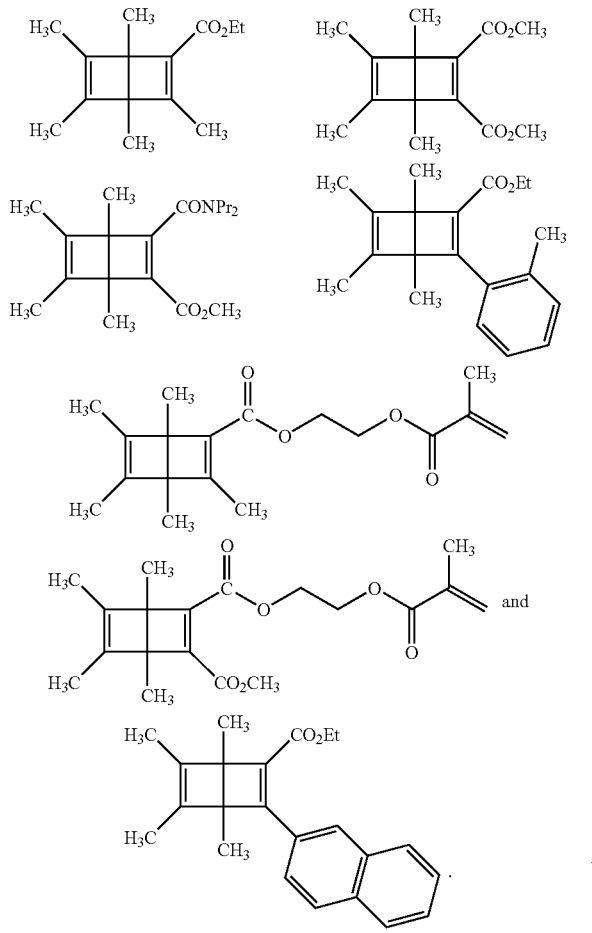

47. The optical device of claim 31, wherein the total weight of said reactant plus said product comprises 2 to 80 percent by weight of said recording material.

48. The optical device of claim 31, wherein said sensitizer comprises a ketocoumarin, xanthone, thioxanthone, or benzophenone derivative.

49. The optical device of claim 48, wherein said sensitizer is selected from the group consisting of:

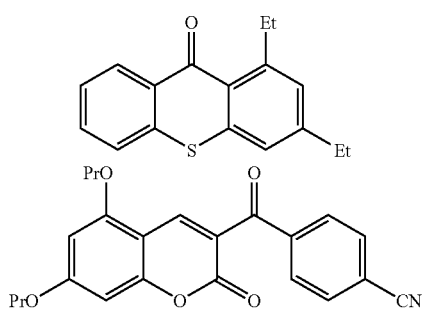

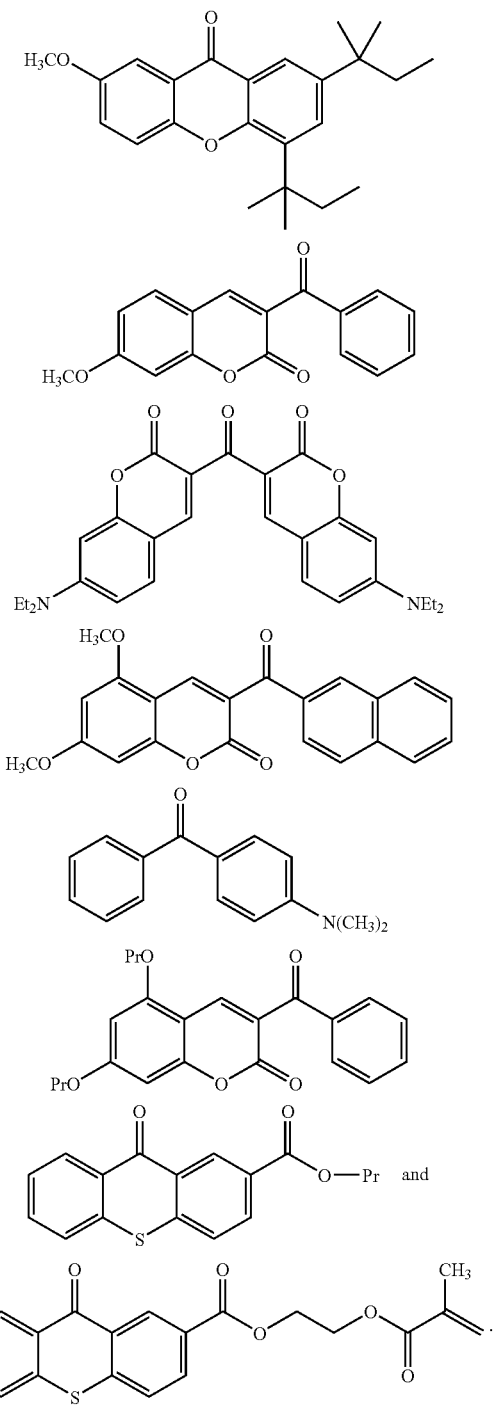

50. The optical device of claim 31, wherein said sensitizer has a triplet energy of at least 45 kcal/mole and an intersystem crossing quantum yield of at least 0.2.

51. The optical device of claim 31, wherein said sensitizer has a triplet energy no more than 4 kcal/mole below the triplet energy of said reactant.

52. The optical device of claim 31, wherein said sensitizer comprises 0.002 to 20 percent by weight of said recording material.

53. The optical device of claim 31, wherein said cosensitizer has a triplet energy between 4 kcal/mole above the triplet energy of said sensitizer and 4 kcal/mole below the triplet energy of said reactant.

54. The optical device of claim 31, wherein said cosensitizer comprises a naphthalene derivative.

55. The optical device of claim 31, wherein said cosensitizer comprises from 1 to 90% by weight of said recording material.

56. The optical device of claim 31, further comprising a plasticizer.

57. The optical device of claim 31, wherein said pattern of intelligence comprises a pattern of refractive indices.

58. The optical device of claim 31 further comprising a support.

59. The optical device of claim 31 further comprising a protective overcoat layer.

60. The optical device of claim 31 further comprising an overcoat layer wherein said overcoat layer comprises an absorber material that absorbs light in the same wavelength region as said sensitizer.

61. The optical device of claim 31, wherein said pattern of intelligence is detected using wavelengths of light different than those comprising said actinic radiation absorbed by said sensitizer.

* * * * *